United States Patent
Kaajakari

(10) Patent No.: US 11,781,867 B2
(45) Date of Patent: Oct. 10, 2023

(54) PIEZOELECTRIC FREQUENCY-MODULATED GYROSCOPE

(71) Applicant: MURATA MANUFACTURING CO., LTD., Nagaokakyo (JP)

(72) Inventor: Ville Kaajakari, Helsinki (FI)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 57 days.

(21) Appl. No.: 17/529,693

(22) Filed: Nov. 18, 2021

(65) Prior Publication Data

US 2022/0178696 A1    Jun. 9, 2022

(30) Foreign Application Priority Data

Dec. 3, 2020  (FI) ..................... 20206245

(51) Int. Cl.
G01C 19/5762   (2012.01)
G01C 19/5649   (2012.01)
G01C 19/5656   (2012.01)

(52) U.S. Cl.
CPC ..... *G01C 19/5762* (2013.01); *G01C 19/5649* (2013.01); *G01C 19/5656* (2013.01)

(58) Field of Classification Search
CPC ................................................. G01C 19/5762
See application file for complete search history.

(56) References Cited

U.S. PATENT DOCUMENTS 6,806,991 B1 * 10/2004 Sarkar .................. G01Q 10/04
                                                   359/290
7,389,691 B2 *  6/2008 Kai ...................... G01P 15/123
                                                   73/514.36

(Continued)

FOREIGN PATENT DOCUMENTS

EP    1018635 A1   7/2000
EP    2775258 A1   9/2014
EP    3 633 316 A1   4/2020

OTHER PUBLICATIONS

European Search Report dated Apr. 21, 2022 corresponding to European Patent Application No. 21209833.

(Continued)

*Primary Examiner* — Paul M. West
*Assistant Examiner* — Mark A Shabman
(74) *Attorney, Agent, or Firm* — SQUIRE PATTON BOGGS (US) LLP

(57) ABSTRACT

A gyroscope includes a proof mass, and a first transduction/suspension structure coupled to the proof mass with a laterally flexible first coupling spring from a first coupling direction. A second transduction/suspension structure is coupled to the proof mass with a laterally flexible second coupling spring from a second coupling direction. A third transduction/suspension structure is coupled to the proof mass with a transversally flexible third coupling spring from a third coupling direction. A fourth transduction/suspension structure is coupled to the proof mass with a transversally flexible fourth coupling spring from a fourth coupling direction. Each transduction/suspension structure comprises elongated beams. Piezoelectric transducers are deposited on some elongated beams, and are configured to bend the corresponding elongated beams in the device plane and to measure the bending of the corresponding lateral elongated beams in the device plane.

13 Claims, 17 Drawing Sheets

(56) References Cited

U.S. PATENT DOCUMENTS

| | | | | |
|---|---|---|---|---|
| 2010/0077858 A1* | 4/2010 | Kawakubo | .............. | G01P 15/18 |
| | | | | 73/504.12 |
| 2013/0276536 A1* | 10/2013 | Kanemoto | ......... | G01C 19/5762 |
| | | | | 73/504.12 |
| 2014/0174180 A1 | 6/2014 | Jeong et al. | | |
| 2015/0241215 A1* | 8/2015 | Kim | .................. | G01C 19/5755 |
| | | | | 73/504.12 |
| 2018/0340776 A1* | 11/2018 | Kuisma | .............. | G01C 19/5769 |
| 2018/0340955 A1* | 11/2018 | Kuisma | ............... | G01P 15/0922 |
| 2020/0109945 A1* | 4/2020 | Kuisma | .............. | G01C 19/5684 |

OTHER PUBLICATIONS

Finnish Search Report dated Jun. 16, 2021 corresponding to Finnish Patent Application No. 20206245.

* cited by examiner

PIEZOELECTRIC
FREQUENCY-MODULATED GYROSCOPE

FIELD OF THE DISCLOSURE

This disclosure relates to microelectromechanical (MEMS) gyroscopes, and more particularly to frequency-modulated gyroscopes. The present disclosure further concerns gyroscopes that are driven with piezoelectric transducers.

BACKGROUND OF THE DISCLOSURE

Most MEMS gyroscopes utilize an oscillating resonator where a proof mass system is suspended with at least two degrees of freedom so that it can oscillate in a first oscillation mode and a second oscillation mode which are preferably orthogonal to each other.

In amplitude-modulated gyroscopes, the proof mass system is actuated into the first oscillation mode (which may be called the drive oscillation mode or primary oscillation mode) by a drive transducer. The drive transducer excites the drive oscillation mode with a large vibration amplitude. The Coriolis force will excite the second oscillation mode (which may be called the sense oscillation mode or secondary oscillation mode) when the gyroscope undergoes rotation. The amplitude of the sense oscillation, which is typically much smaller than the amplitude of the drive oscillation, is measured with a sense transducer.

Amplitude-modulated gyroscopes have good sensitivity, but the scale factor of the sense oscillation measurement is usually not very stable, due to the many analog components which are required to measure the sense oscillation amplitude. In a typical arrangement the scale factor can vary by several percent over the temperature range where the gyroscope is used.

In frequency-modulated gyroscopes, drive transducers are configured to actuate the proof mass system into both the first and the second oscillation modes with nominally equal amplitudes. The proof masses which form the system are thereby driven into periodic oscillation where the first and second oscillation modes are superposed.

The periodic oscillation has an initial oscillation frequency when the gyroscope is stationary. The Coriolis force will shift the oscillation frequency away from this initial value when the gyroscope undergoes rotation. Consequently, the rotation rate can be inferred from the oscillation frequency of the proof mass system. A frequency measurement is essentially a digital operation. Frequency-modulated gyroscopes can therefore measure the rotation rate with a very stable scale factor.

Document EP2775258 discloses a piezoelectrically driven frequency-modulated gyroscope. A problem with this gyroscope is that the two oscillation modes of the proof mass are coupled to each other when the gyroscope is actuated with a sufficiently large oscillation amplitude to allow accurate frequency measurements. The accuracy of the gyroscope is therefore limited, and the cross-coupling of the modes complicates the control of the proof mass trajectory.

BRIEF DESCRIPTION OF THE DISCLOSURE

An object of the present disclosure is to provide an apparatus for alleviating the above disadvantages.

The object of the disclosure is achieved by an arrangement which is characterized by what is stated in the independent claim. The preferred embodiments of the disclosure are disclosed in the dependent claims.

The disclosure is based on the following idea: the motion of the proof mass is drive and sensed by piezoelectric transducers which actuate and/or measure the motion of the proof mass in a given actuation direction. Each of these piezoelectric transducers is coupled to the proof mass with a coupling spring which is flexible in a direction perpendicular to the actuation direction of said piezoelectric transducer.

An advantage of this arrangement is that two orthogonal oscillation modes can be driven and sensed effectively, but still remain substantially decoupled. A highly accurate piezoelectrically driven frequency-modulated gyroscope can thereby be obtained.

BRIEF DESCRIPTION OF THE DRAWINGS

In the following the disclosure will be described in greater detail by means of preferred embodiments with reference to the accompanying drawings, in which

FIGS. 6b-6c illustrate the oscillation modes of the device shown in FIG. 6a.

FIG. 7 shows how piezoelectric transducers may be placed in the device shown in FIG. 2a.

DETAILED DESCRIPTION OF THE DISCLOSURE

Figure 1A:
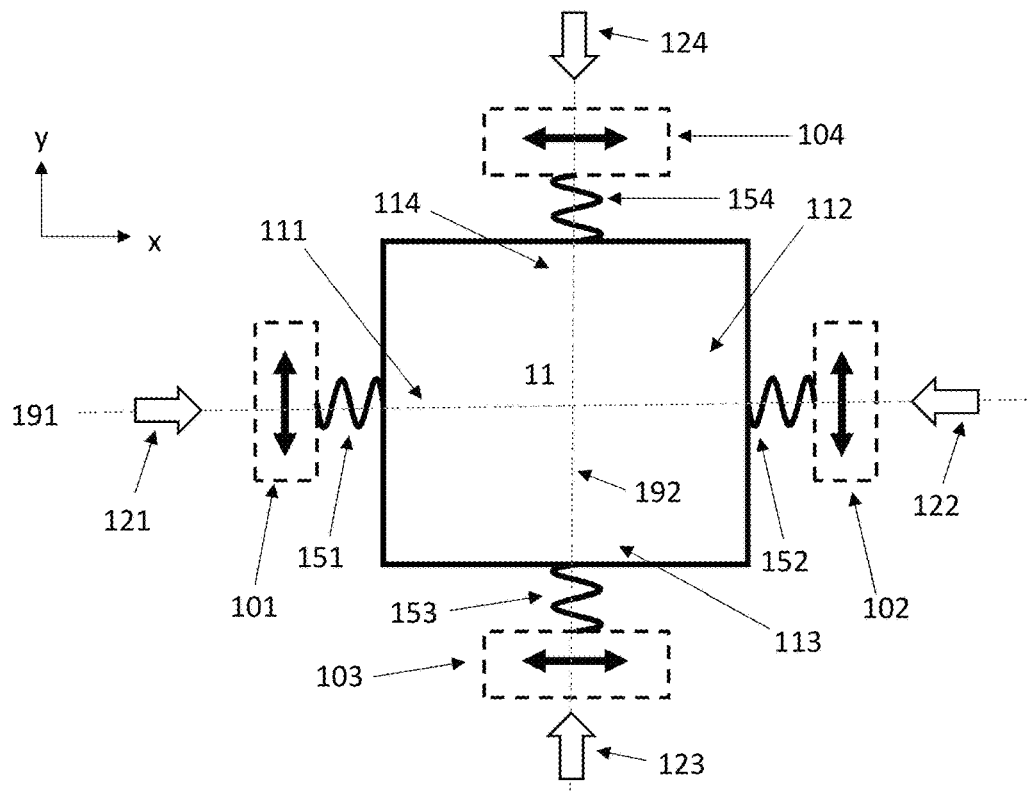
FIGS. 1a-1d illustrate gyroscopes with a proof mass, transduction/suspension structures and coupling springs.

This disclosure described a gyroscope comprising a proof mass aligned on a lateral axis and on a transversal axis which is orthogonal to the lateral axis. The lateral and transversal axes define a device plane.

The gyroscope further comprises a first transduction/suspension structure which is coupled to the proof mass with a laterally flexible first coupling spring from a first coupling direction, and a second transduction/suspension structure which is coupled to the proof mass with a laterally flexible second coupling spring from a second coupling direction. The gyroscope also comprises a third transduction/suspension structure which is coupled to the proof mass with a transversally flexible third coupling spring from a third coupling direction, and a fourth transduction/suspension structure which is coupled to the proof mass with a transversally flexible fourth coupling spring from a fourth coupling direction. The first and second coupling directions are substantially opposite to each other, the third and fourth coupling directions are substantially opposite to each other, and the first and second coupling directions are substantially perpendicular to the third and fourth coupling directions.

The first transduction/suspension structure comprises one or more first lateral elongated beams which extend from corresponding one or more anchor points in a first lateral direction. The second transduction/suspension structure comprises one or more second lateral elongated beams which extend from corresponding one or more anchor points in a second lateral direction. The second lateral direction is opposite to the first.

The third transduction/suspension structure comprises one or more first transversal elongated beams which extend from corresponding one or more anchor points in a first transversal direction. The fourth transduction/suspension structure comprises one or more second transversal elongated beams which extend from corresponding one or more anchor points in a second transversal direction. The second transversal direction is opposite to the first.

The first and second transduction/suspension structures further comprise one or more lateral piezoelectric transducers which have been deposited on the one or more first or second lateral elongated beams. The third and fourth transduction/suspension structures further comprise one or more transversal piezoelectric transducers which have been deposited on the one or more first or second transversal elongated beams.

Said one or more lateral piezoelectric transducers are configured to bend the corresponding lateral elongated beams in the device plane and to measure the bending of the corresponding lateral elongated beams in the device plane and said one or more transversal piezoelectric transducers are configured to bend the corresponding transversal elongated beams in the device plane and to measure the bending of the corresponding transversal elongated beams in the device plane.

The proof mass may have a first side and a laterally opposing second side, so that the first side and the second side are separated from each other by a lateral width. The proof mass may have a third side and a transversally opposing fourth side, so that the third side and the fourth side are separated from each other by a transversal width.

In this disclosure, the term "coupling direction" refers to the direction in which a coupling spring extends from the transduction/suspension structure toward to its attachment point on the proof mass.

In some embodiments the coupling springs are flexible in the coupling direction and stiff in the direction which is perpendicular to the coupling direction. The first transduction/suspension structure may in these embodiments be coupled to the first side of the proof mass and the second transduction/suspension structure may be coupled to the second side of the proof mass, The third transduction/suspension structure may be coupled to the third side of the proof mass and the fourth transduction/suspension structure may be coupled to the fourth side of the proof mass.

However, the coupling spring could alternatively be stiff in the coupling direction and flexible in the direction which is perpendicular to the coupling direction. The first transduction/suspension structure may in this case be coupled to the third side of the proof mass and the second transduction/suspension structure may be coupled to the fourth side of the proof mass, The third transduction/suspension structure may be coupled to the first side of the proof mass and the fourth transduction/suspension structure may be coupled to the second side of the proof mass.

In this disclosure the device plane is illustrated and referred to as the xy-plane. The x-direction is referred to as the lateral direction and the y-direction as the transversal direction. The device plane may also be called the horizontal plane. The z-axis is perpendicular to the xy-plane. It may also be called the vertical axis. In this disclosure, the words "horizontal" and "vertical" refer to the device plane and a direction perpendicular to the device plane, respectively. The words "horizontal" and "vertical" do not imply anything about how the device should be oriented during manufacture or usage.

The device plane is typically defined by the wafer in which the micromechanical structures are prepared. The wafer may be a silicon wafer and the structures of the gyroscope may be formed in the silicon wafer by etching. The wafer may be a single-crystal silicon wafer, or a polycrystalline silicon wafer which has been grown for example by epitaxial growth. The wafer may for example have a thickness of 10-150 μm in the vertical direction, and the thicknesses of all structures in the gyroscope may be the same as the thickness of the wafer. In frequency modulated gyroscope applications, it is desirable to reduce the temperature dependency of the frequency of the resonating proof mass. This can be achieved by doping the silicon wafer with phosphorus. The phosphorus doping density may for example be greater than 5e18 $cm^{-3}$.

Figure 2A:
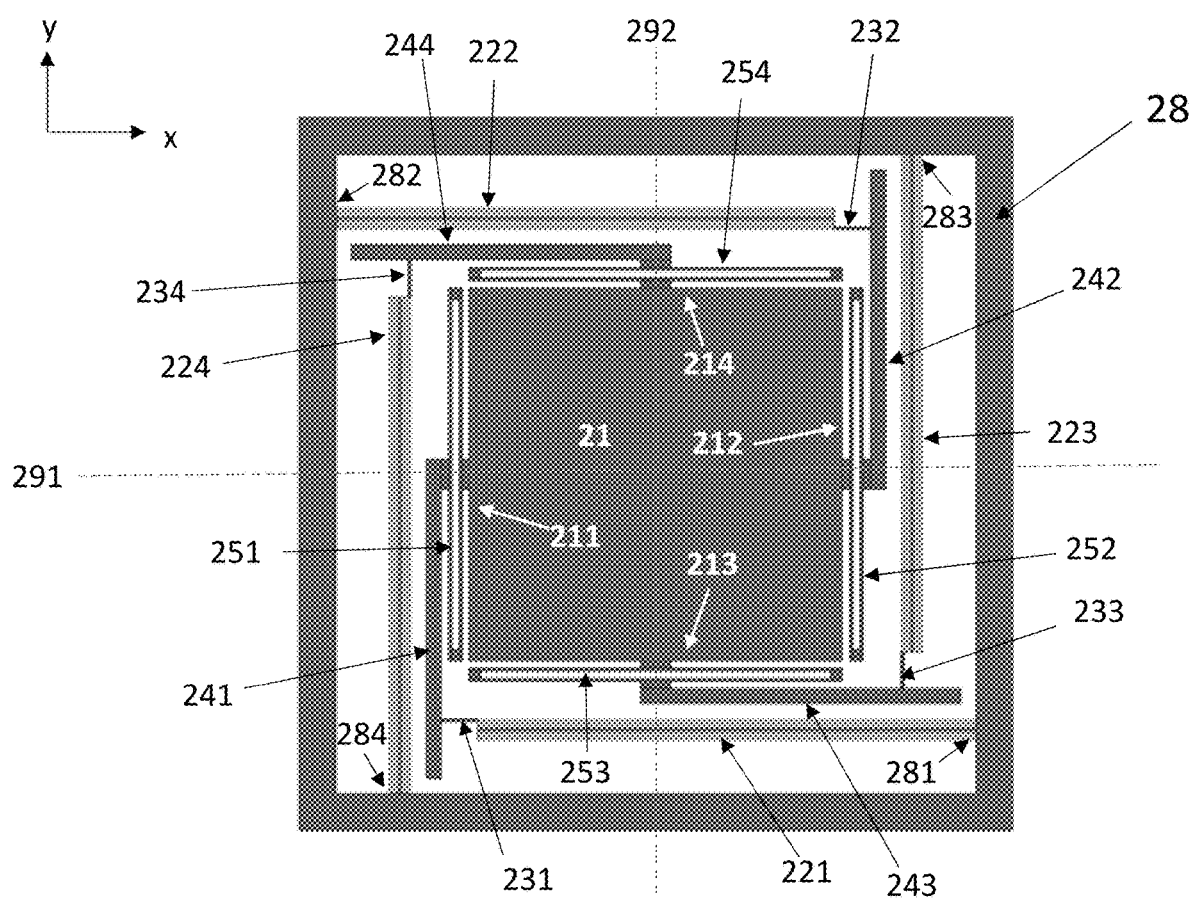
FIGS. 2a-2c illustrate embodiments where the transduction/suspension structures and coupling springs are placed around the periphery of the proof mass.

Rotation about any axis perpendicular to the device plane is referred to in this disclosure as rotation about the z-axis. In this disclosure, the term "spring" refers to a device part which is flexible in at least one direction. The proof mass and all the parts of the transduction/suspension structures which are illustrated in FIG. 2a can be formed in a silicon wafer. The lateral width of the proof mass may be equal to the transversal width of the proof mass, and both of these widths may for example be in the range 200-2000 μm, or in the range 400-800 μm.

The first and second coupling springs may be stiff in the transversal direction. The third and fourth coupling springs may be stiff in the lateral direction.

In this disclosure, the term transduction/suspension structure refers to a structure which may contain a piezoelectric force transducer on an elongated beam. The piezoelectric force transducer may be configured either to bend said elongated beam in the device plane or to measure how much said elongated beam bends in the device plane. A transducer which performs the former function may be called a drive transducer, and a device which performs the latter function may be called a sense transducer.

This naming of drive and sense transducers is purely for illustrating the operation of the gyroscope when combined with control electronics to drive the mass in the desired trajectory. The sense transducers may be used to detect the gyroscope vibrations and thereby to generate sense signal. This sense signal may be used to generate drive signal that is applied to drive transduces to maintain desired mass trajectory. Furthermore, in frequency modulated gyroscope operation, the sense signal frequency is used to infer rotation rate. In a typical implementation, the drive and sense transducers are identical and hence interchangeable. Moreover, the separation of drive and sense transducers simplifies the implementation of control electronics, but separate drive and sense transducers are not necessarily needed. A single transducer may act both for generating drive force and sense signal, as is done for example in common quartz oscillators.

Each of the one or more lateral piezoelectric transducers which are deposited on the one or more first or second lateral elongated beams may both drive and sense the transversal movement of the proof mass. In other words, these lateral piezoelectric transducers may be configured both to bend the corresponding lateral elongated beams in the device plane and to measure the bending of the corresponding lateral elongated beams in the device plane.

Correspondingly, each of the one or more transversal piezoelectric transducers which are deposited on the one or more first or second transversal elongated beams may perform both drive and sense the lateral movement of the proof mass. These transversal piezoelectric transducers may therefore be configured to bend the corresponding transversal elongated beams in the device plane and to measure the bending of the corresponding transversal elongated beams in the device plane.

The driving and sensing of the transversal movement could alternatively be performed by separate lateral piezoelectric transducers, so that each of the one or more lateral piezoelectric transducers is dedicated either to the drive function or to the sense function, but none of them is dedicated to both. The same applies to the driving and sensing of the lateral movement by the one or more transversal piezoelectric transducers. These options will be described in more detail below.

The transduction/suspension structures described in this disclosure may also be suspension structures which extend from a fixed anchor point to the proof mass and support the weight of the proof mass. Suspension structures should include at least one flexible suspender which provides the flexibility needed for accommodating the desired oscillatory movement of the proof mass. Suspension structures may also include substantially rigid parts. In the transduction/suspension structures described in this disclosure, the elongated beams are flexible and can bend at least in a direction which is perpendicular to the direction in which they extend.

However, it should be noted that the transduction/suspension structures described in this disclosure do not necessarily have to support the weight of the proof mass. The proof mass could be suspended with other suspenders, and the transduction/suspension structures could then be used only to generate a driving force and to measure the movement of the proof mass. Some transduction/suspension structures may be used only for transduction purposes and others may be used only for suspension purposes, but it is also possible to use all transduction/suspension structures for both purposes.

FIG. 1a illustrates schematically a gyroscope with a proof mass 11. The proof mass has a first (111), second (112), third (113) and fourth (114) side. The proof mass lies in a device plane defined by the lateral axis 191 and the transversal axis 192. The gyroscope comprises a first transduction/suspension structure 101 attached to the first side 111 of proof mass 11, and a second transduction/suspension structure 102 attached to the second side 112 of proof mass 11. These two transduction/suspension structures drive and/or measure proof mass movement in the transversal direction, as illustrated by the double-ended transversal arrow inside the boxes which illustrate the transduction/suspension structures. Furthermore, the first and second transduction/suspension structures (101, 102) are attached to the proof mass 11 with the first coupling spring 151 and the second coupling spring 152, respectively.

The gyroscope also comprises a third transduction/suspension structure 103 attached to the third side 113 of proof mass 11, and a fourth transduction/suspension structure 104 attached to the fourth side 114 of proof mass 11. These two transduction/suspension structures drive and/or measure proof mass movement in the lateral direction, as illustrated by the double-ended lateral arrows. Furthermore, the third and fourth transduction/suspension structures (103, 104) are attached to the proof mass 11 with the third coupling spring 153 and the fourth coupling spring 154, respectively.

Figure 1B:
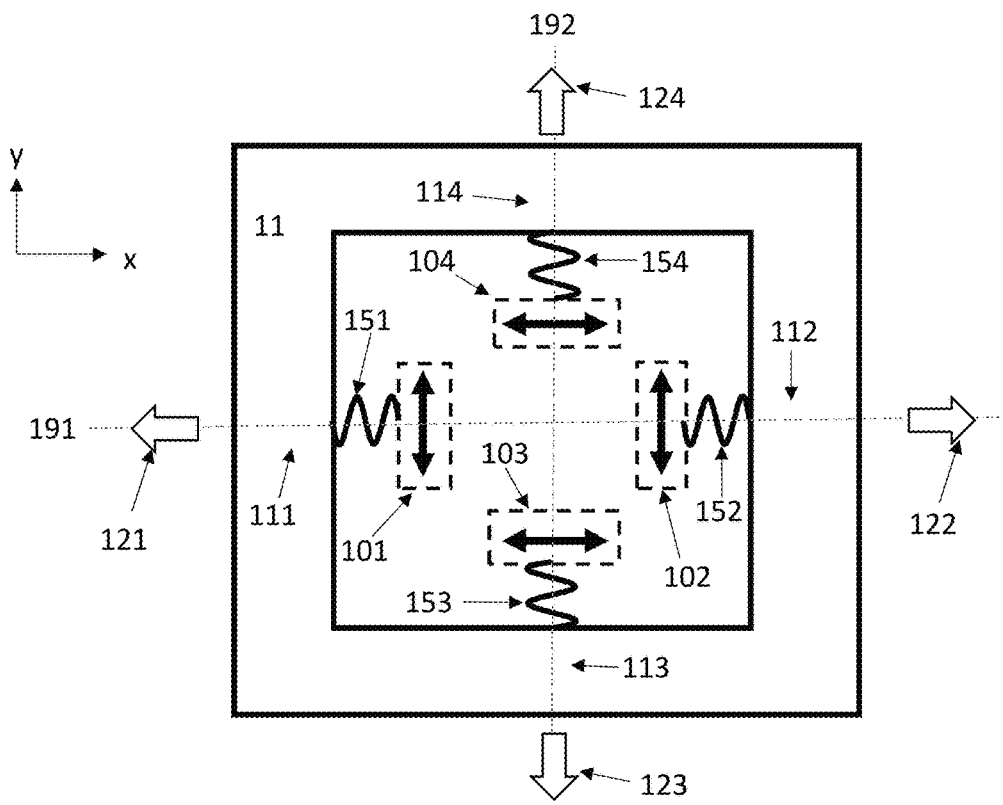

FIG. 1a illustrates a periphery embodiment where the transduction/suspension structures and coupling springs are located around the periphery of the proof mass 11. FIG. 1b illustrates a center embodiment where the proof mass 11 has the shape of a frame with a central opening, and the transduction/suspension structures and coupling springs are located within this central opening.

The proof mass may have a square shape or a frame-square shape, as FIGS. 1a and 1b illustrate. However, the proof could alternatively have any other suitable shape. The proof mass may be aligned on both the lateral and the transversal axis 191 and 192. It may be substantially reflection-symmetric with respect to both of these axes, as FIGS. 1a and 1b illustrate.

The first and second coupling springs 151-152 may, but do not necessarily have to, be aligned on the lateral axis 191. The third and fourth coupling springs 153-154 may, but do not necessarily have to, be aligned on the transversal axis 192. For simplicity, only one first, second, third and fourth coupling spring is illustrated and discussed in each embodiment presented in this disclosure. However, the function which each of the described coupling springs perform could alternatively be divided onto multiple coupling springs attached between the corresponding transduction/suspension structure to the proof mass.

The first coupling spring 151 is coupled to the proof mass 11 from a first coupling direction 121 and the second coupling spring 152 is coupled to the proof mass 11 from a second coupling direction 122. The first coupling direction 121 is substantially opposite to the second 122, but they do not necessarily have to be aligned on the same axis. They may, but do not necessarily have to be, radially opposite directions in relation to the center point, where the lateral axis 191 crosses the transversal axis 192. The first coupling direction 121 could for example be a rightward direction above the lateral axis 191 in FIG. 1a, while the second coupling direction 122 could be a leftward direction below the lateral axis 191.

The same considerations apply to the third and fourth coupling springs 153 and 154. In other words, the third coupling spring 153 is coupled to the proof mass 11 from a third coupling direction 123 and the fourth coupling spring 154 is coupled to the proof mass 11 from a fourth coupling direction 124. The third coupling direction 123 is substantially opposite to the fourth 124, but the options mentioned in the previous paragraph apply here as well, mutatis mutandis.

In FIGS. 1a and 1b the first and second coupling springs 151-152 are laterally flexible, as mentioned above. These coupling springs are also sufficiently stiff in the transversal direction to transfer the transversal movement of the proof mass 11 to the first and second transduction/suspension structures effectively, and vice versa. Conversely, the third and fourth coupling springs 153-154 are transversally flexible, but also sufficiently stiff in the lateral direction to transfer the lateral movement of the proof mass 11 to the first and second transduction/suspension structures effectively, and vice versa.

In a first oscillation mode is driven and sensed by the third and fourth transduction/suspension structures 103 and 104, the proof mass 11 is driven to oscillate back and forth along the lateral axis 191. In a second oscillation mode driven and sensed by the first and second transduction/suspension structure 101 and 102, the proof mass 11 is driven to oscillate back and forth along the transversal axis 192. The first and second oscillation modes may be resonance modes. The combinations of coupling spring flexibility/stiffness described in the previous paragraph effectively prevent cross-coupling between the first and second oscillation modes.

FIGS. 1a and 1b illustrate embodiments where the first and second coupling directions 121 and 122 are lateral directions and the third and fourth coupling directions 123 and 124 are transversal directions. However, these coupling directions could alternatively be tilted at an angle in relation to the lateral and transversal directions, as long as the first and second coupling structures have lateral flexibility and the third and fourth coupling structures have transversal flexibility, as mentioned above.

Figure 1C:
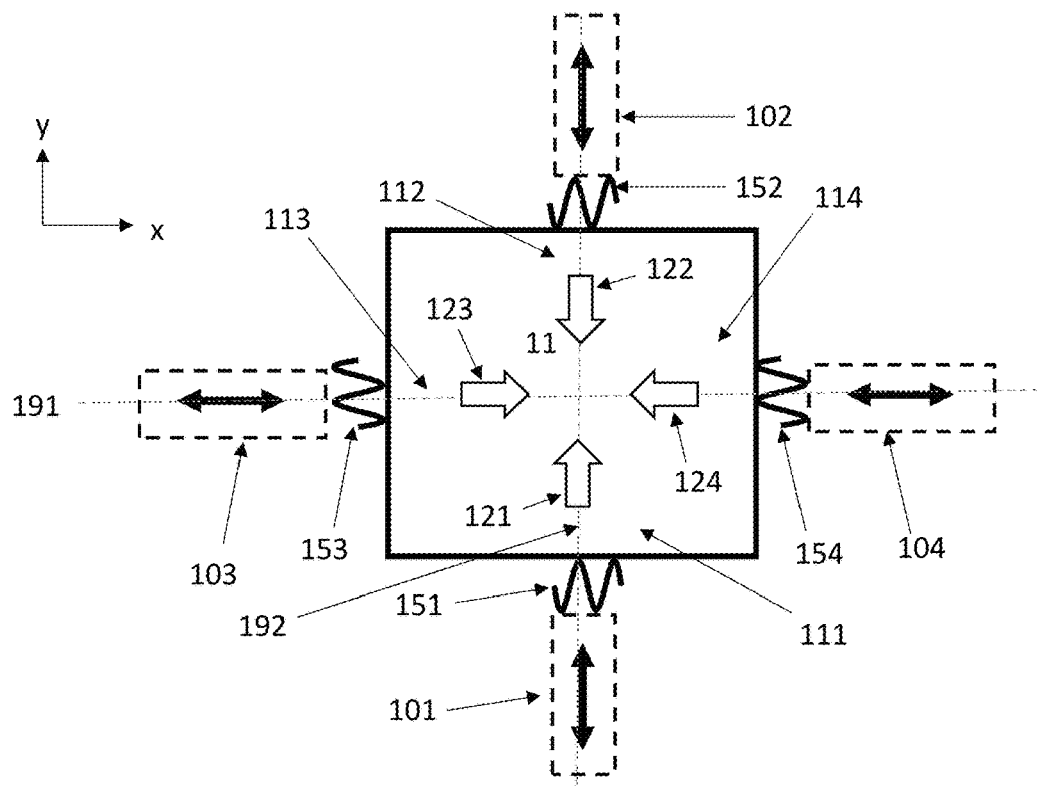
Figure 1D:
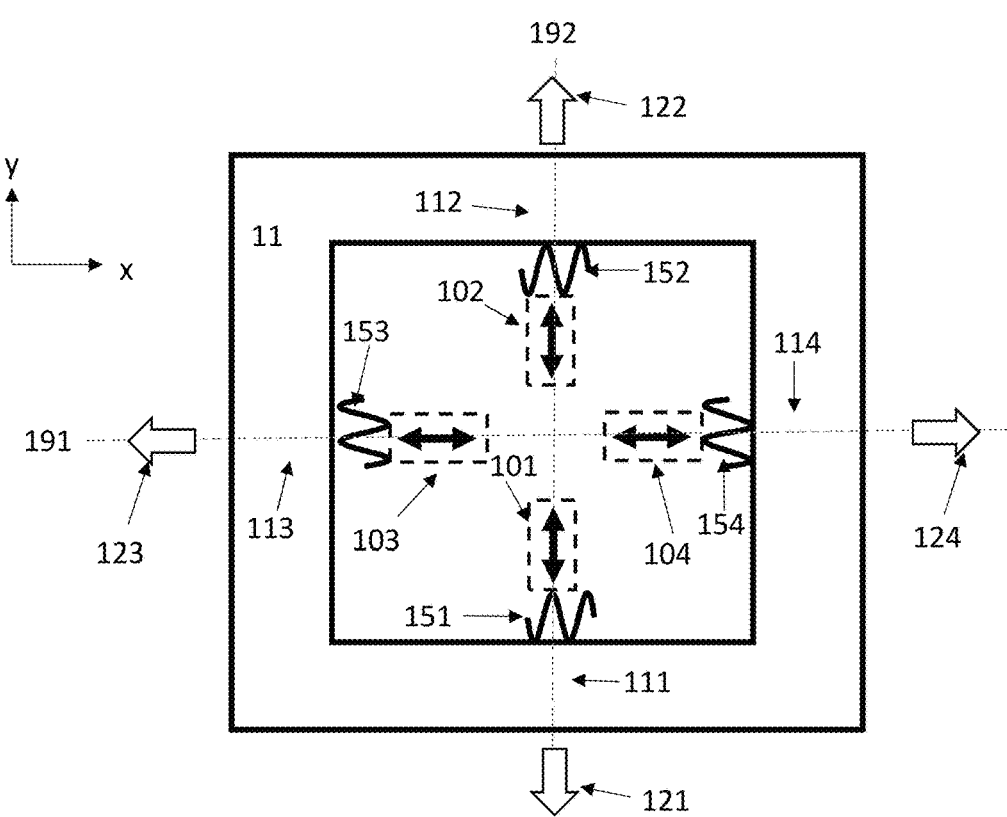

It is also possible to arrange the transduction/suspension structures in a different geometry which is illustrated in FIGS. 1c and 1d. Here the proof mass again has a first (111), second (112), third (113) and fourth (114) side, but this time the first and second sides are transversally opposing sides and the third and fourth sides are laterally opposing sides. Furthermore, the first and second coupling springs 151-152 may in this case be aligned on the transversal axis 191 and the third and fourth coupling springs 153-154 may be aligned on the lateral axis 191.

In FIGS. 1c and 1d, the first coupling spring 151 is coupled to the proof mass 11 from a first coupling direction 121 and the second coupling spring 152 is coupled to the proof mass 11 from a second coupling direction 122, the third coupling spring 153 is coupled to the proof mass 11 from a third coupling direction 123 and the fourth coupling spring 154 is coupled to the proof mass 11 from a fourth coupling direction 124. The coupling direction options mentioned with reference to FIGS. 1a and 1b apply here as well, mutatis mutandis.

In FIGS. 1c and 1d, the first and second coupling springs 151-152 are laterally flexible, the third and fourth coupling springs 153-154 are transversally flexible, as in FIGS. 1a and 1d. However, unlike in FIGS. 1a and 1b, the coupling springs 151-154 are in FIGS. 1c and 1b not flexible in their respective coupling directions. Instead, they are flexible in directions which are substantially perpendicular to their coupling directions.

The transduction structures 101-104 perform the same function in FIGS. 1c and 1d as in FIGS. 1a and 1b, In all FIGS. 1a-1d, the oscillation which the proof mass undergoes in the first oscillation mode is substantially independent of its oscillation in the second oscillation mode. When the driving of the first oscillation mode is synchronized in a suitable manner with the driving of the second oscillation mode, the proof mass can be stably driven for example in a circular or Lissajous trajectory in the device plane. These are advantageous mass trajectories for example in frequency-modulated gyroscopes. The following embodiments describe in more detail gyroscope structures which may be used as piezoelectric frequency-modulated gyroscopes.

Periphery Embodiments

FIG. 2a illustrates an embodiment where the transduction/suspension structures and coupling springs are placed around the periphery of the proof mass. Reference numbers 21, 211-214, 251-254 and 291-292 correspond to reference numbers 11, 111-114, 151-154 and 191-192, respectively, in FIG. 1a.

The first transduction/suspension structure comprises a first lateral elongated beam 221, a first transversal coupler 241 and a first coupling spring 251. The first transduction/suspension structure also comprises an optional first flexure 231 with transversal flexibility. The flexures described in this disclosure attach lateral and transversal elongated beams to transversal and lateral couplers, respectively. When a drive transducer bends an elongated beam such as 221, the bending puts the coupler (in this case 241) in motion approximately in the direction which is perpendicular to the elongated beam 221 (in this case the transversal direction).

The second transduction/suspension structure comprises a second lateral elongated beam 222, a second transversal coupler 242 and a second coupling spring 252. The third transduction/suspension structure comprises a first transversal elongated beam 223, a first lateral coupler 243 and a third coupling spring 253. The fourth transduction/suspension structure comprises a second transversal elongated beam 224, a second lateral coupler 244 and a fourth coupling spring 254. Optional first flexures 231-232 and second flexures 233-234 are also illustrated in each transduction/suspension structure.

Regardless of whether a flexure is used or not, the bending of the first lateral elongated beam 221 will move the first transversal coupler 241 substantially in the transversal direction. The direction of movement may deviate slightly from the transversal direction since it may be difficult to achieve fully orthogonal force transfer at the attachment point between an elongated beam and a coupler, but this deviation does not have practical significance.

The proof mass is in this case suspended from the first, second, third and fourth anchor points 281-284, which may for example be points on a fixed frame 28 which surrounds the mobile proof mass 21, as illustrated in FIG. 2a. Alternatively, the anchor points may be parts of one or more other fixed structures which are adjacent to the proof mass 21. The first, second, third and fourth transduction/suspension structure also function as suspension elements.

In FIG. 2a, the one or more first lateral elongated beams consist of one first lateral elongated beam 221, the one or more second lateral elongated beams consist of one second lateral elongated beam 222, the one or more first transversal elongated beams consist of one first transversal elongated beam 223, and the one or more second transversal elongated beams consist of one second transversal elongated beam 224.

Figure 2B:
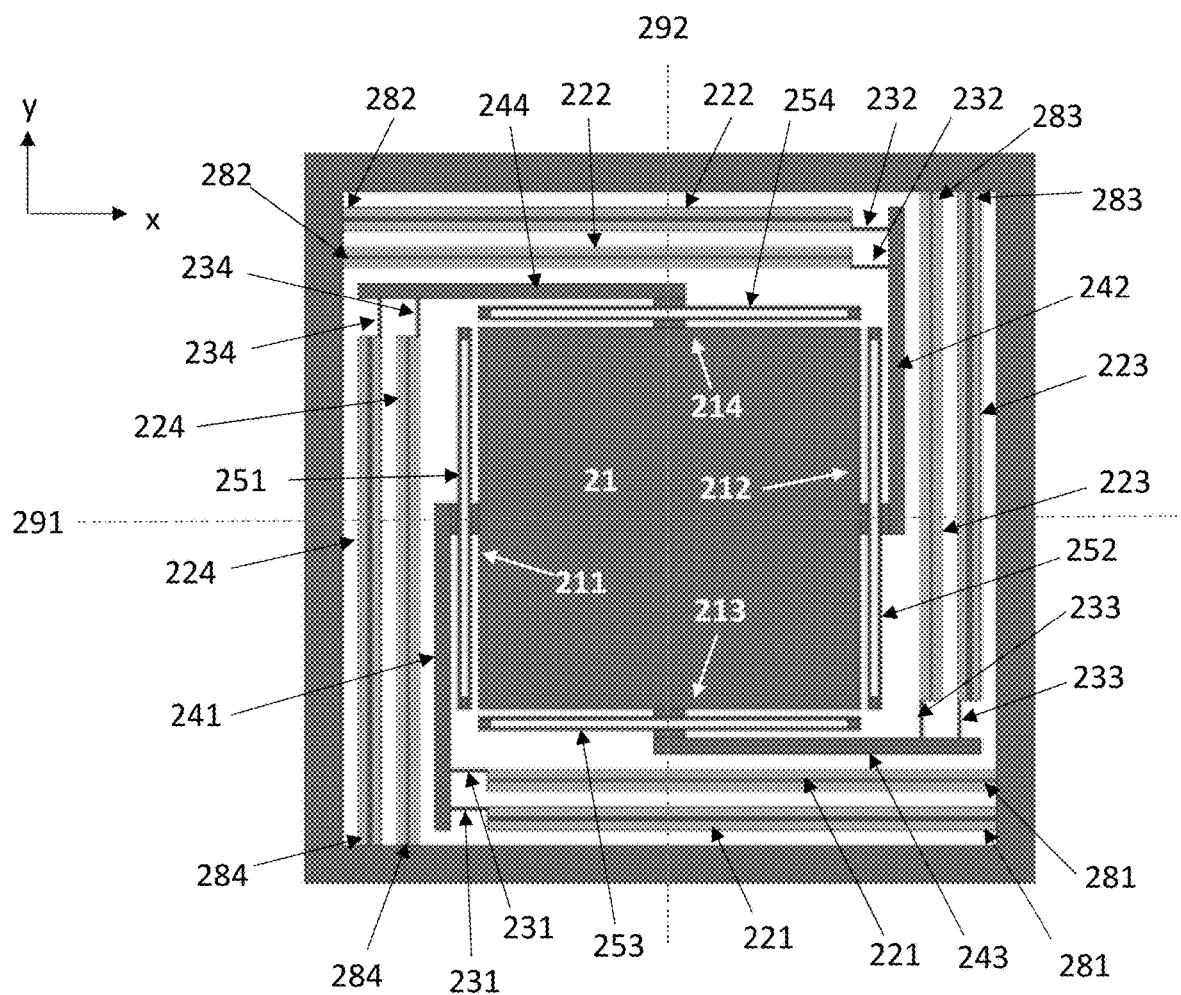

FIG. 2b illustrates an alternative device where the one or more first lateral elongated beams consist of two first lateral elongated beams 221, the one or more second lateral elongated beams consist of two second lateral elongated beams 222, the one or more first transversal elongated beams consist of two first transversal elongated beams 223, and the one or more second transversal elongated beams consist of two second transversal elongated beams 224.

The reference numbers indicated in FIG. 2b correspond to the ones used in FIG. 2a. With two lateral/transversal elongated beams in each transduction/suspension structure, the motion of the corresponding transversal/lateral coupler can be more effectively restricted to the transversal/lateral direction because the possibility of rotational movement of the coupler about the point where it is attached to the optional flexure is inhibited.

In both FIG. 2a and FIG. 2b, the proof mass has a first side and a laterally opposing second side, so that the first side and the second side are separated from each other by a lateral width. The proof mass has a third side and a transversally opposing fourth side, so that the third side and the fourth side are separated from each other by a transversal width.

The one or more first lateral elongated beams 221 extend from the corresponding one or more first anchor points 281 in the first lateral direction along the third side 213 of the proof mass 21. The first transduction/suspension structure also comprises a first transversal coupler 241. Each of the one or more first lateral elongated beams 221 is attached to the first transversal coupler 241, and the first transversal coupler 241 extends along the first side 211 of the proof mass. The first coupling spring 251 extends from the first transversal coupler 241 to the proof mass 21.

The one or more second lateral elongated beams 222 extend from the corresponding one or more second anchor points 282 in the second lateral direction along the fourth side 214 of the proof mass 21. The second transduction/suspension structure also comprises a second transversal coupler 242. Each of the one or more second lateral elongated beams 222 is attached to the second transversal coupler 242, and the second transversal coupler 242 extends along the second side 212 of the proof mass 21. The second coupling spring 252 extends from the second transversal coupler 242 to the proof mass 21.

The one or more first transversal elongated beams 223 extend from the corresponding one or more third anchor points 283 in the first transversal direction along the second side 212 of the proof mass 21. The third transduction/suspension structure also comprises a first lateral coupler 243. Each of the one or more first transversal elongated beams 223 is attached to the first lateral coupler 243. The first lateral coupler 243 extends along the third side 213 of the proof mass 21. The third coupling spring 253 extends from the first lateral coupler 243 to the proof mass 21.

The one or more second transversal elongated beams 224 extend from the corresponding one or more fourth anchor points 284 in the second transversal direction along the first side of the proof mass 211. The fourth transduction/suspension structure also comprises a second lateral coupler 244. Each of the one or more second transversal elongated beams 224 is attached to the second lateral coupler 244 and the second lateral coupler 244 extends along the fourth side 214 of the proof mass 21. The fourth coupling spring 254 extends from the second lateral coupler 244 to the proof mass 21.

Furthermore, in both FIGS. 2a and 2b the one or more second transversal elongated beams 224 are further away from the first side 211 of the proof mass 21 than the first transversal coupler 241. The one or more first transversal elongated beams 223 are further away from the second side 212 of the proof mass 21 than the second transversal coupler 242. The one or more first lateral elongated beams 221 are further away from the third side 213 of the proof mass 21 than the first lateral coupler 243, and the one or more second lateral elongated beams 222 are further away from the fourth side 214 of the proof mass than the second lateral coupler 244.

As indicated above, in this embodiment the one or more anchor points comprise one or more first anchor points, one or more second anchor points, one or more third anchor points and one or more four anchor points.

Figure 2C:
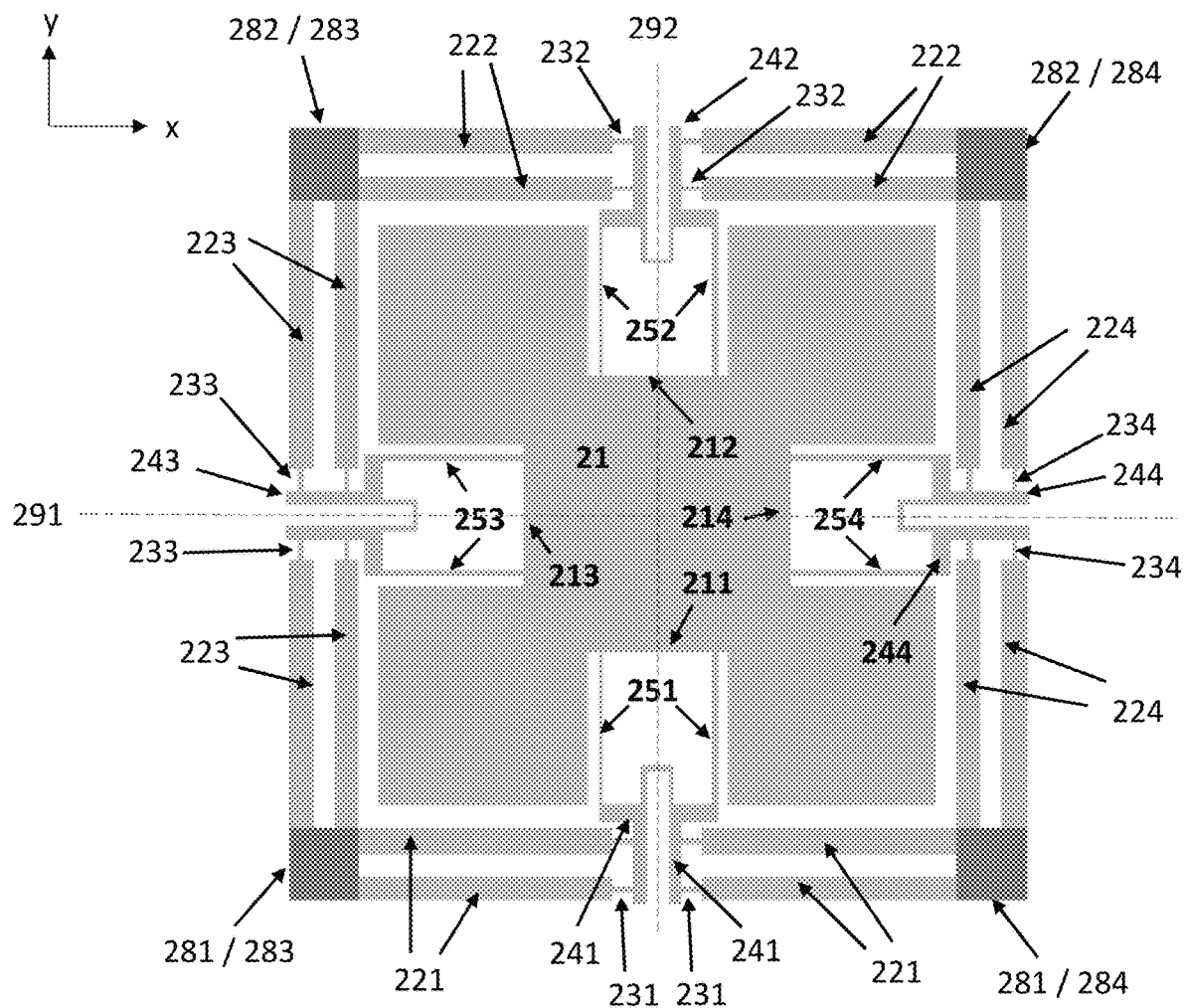

FIG. 2c illustrates another embodiment where the transduction/suspension structures and coupling springs are placed around the periphery of the proof mass. Reference numbers 21, 211-214, 251-254 and 291-292 here correspond to reference numbers 11, 111-114, 151-154 and 191-192, respectively, in FIG. 1c. In other words, here the first and second sides are transversally opposing sides and the third and fourth sides are laterally opposing sides. The first and second coupling springs 251-252 are laterally flexible in FIG. 2c, while the third and fourth coupling springs 253-254 are transversally flexible. Reference numbers 221-224, 231-234, 241-244 and 281-284 in FIG. 2c correspond to the same reference numbers in FIGS. 2a-2c and the device operates according to the principles which have already been described above. In this arrangement, the number of both lateral and transversal beams has been doubled compared to FIG. 2b. The symmetric placement of lateral and transversal elongated beams in the transduction structures allows well-balanced actuation in both the x- and the y-direction.

Figure 3A:
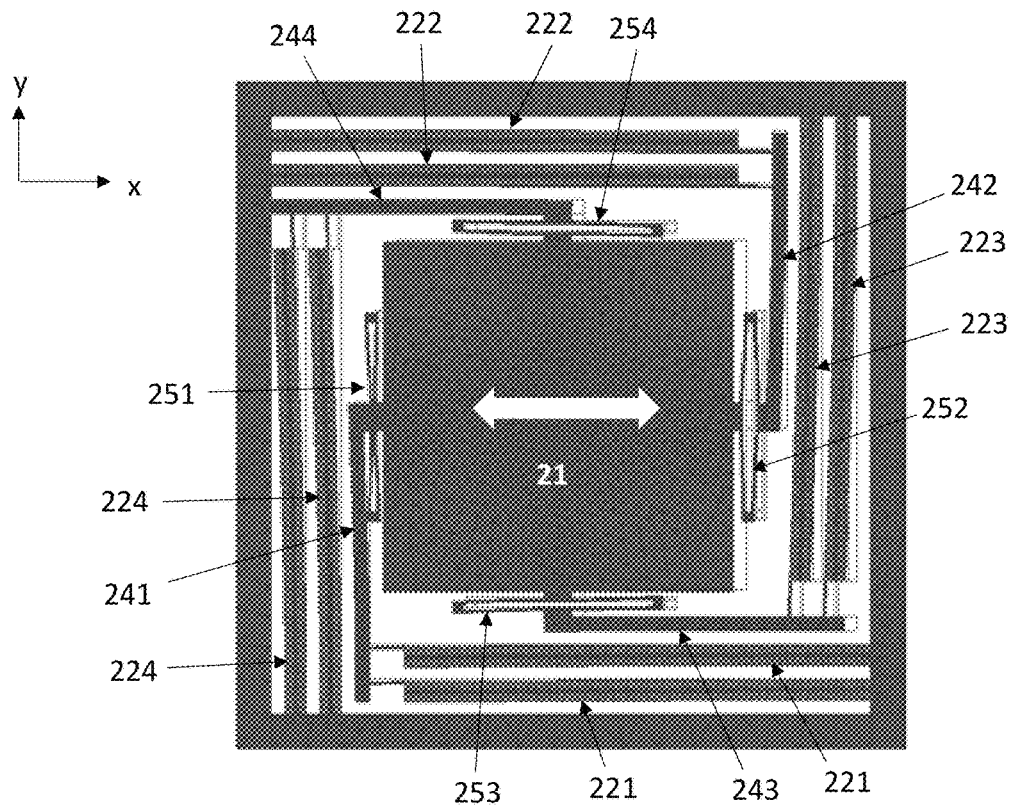
FIGS. 3a-3b illustrate the oscillation modes of the devices shown in FIG. 2a-2b.
Figure 3B:
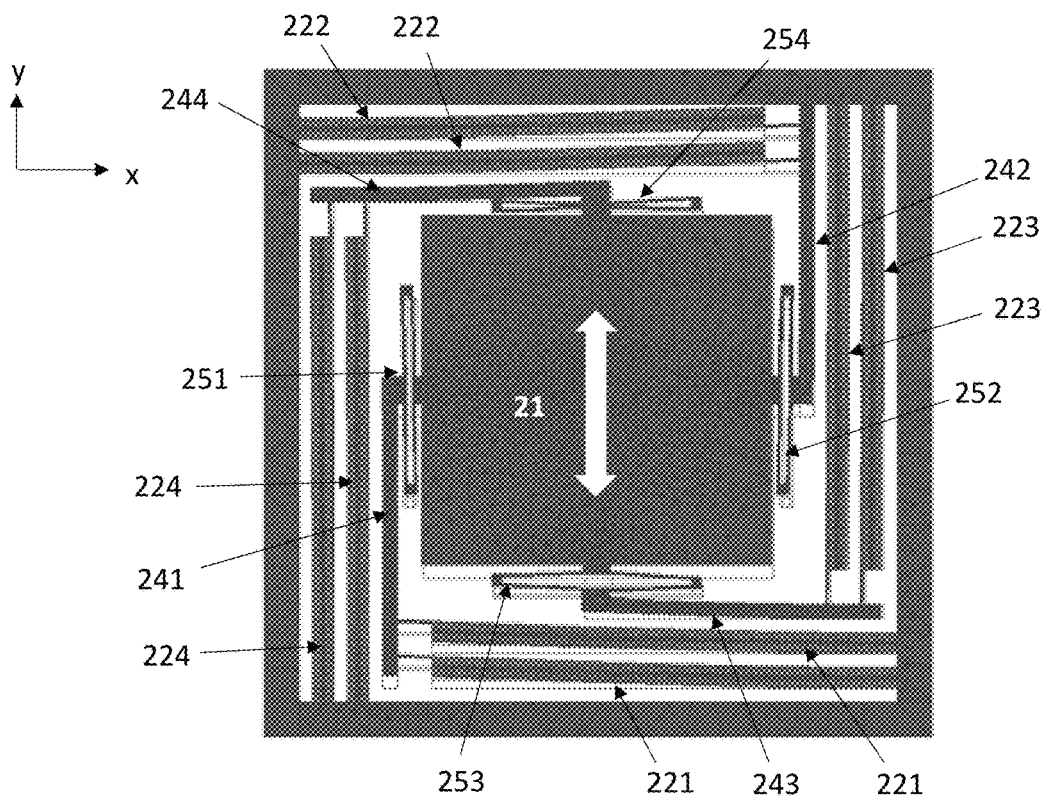

FIGS. 3a and 3b illustrate two oscillation modes which can be obtained in this embodiment. The device in FIG. 2b is used as an illustrative example. FIG. 3a shows a lateral oscillation mode where the proof mass moves back and forth in the lateral direction. In this oscillation mode, lateral drive forces generated by transducers in the third and/or fourth transduction/suspension structures set the proof mass into lateral back and forth oscillation. The first and second lateral couplers 243-244 rigidly transmit the lateral bending of the first and second transversal elongated beams 223-224 into lateral movement in the proof mass 21. Conversely, the influence of the Coriolis force on the lateral oscillation of the proof mass is transmitted by the lateral couplers 243-244 to the first and second transversal elongated beams 223-224, and this influence can be sensed by transducers on these beams.

As indicated above, the first transduction/suspension structure may comprise one or more first flexures 231 with transversal flexibility, and each first lateral elongated beam 221 may be attached to the first transversal coupler 241 with at least one of said one or more first flexures 231. Correspondingly, the second transduction/suspension structure may comprise one or more second flexures 232 with transversal flexibility, and each second lateral elongated beam 222 may be attached to the second transversal coupler 242 with at least one of said one or more second flexures 232.

In other words, each of the lateral elongated beams is attached to the corresponding transversal coupler with a flexure, and each of the transversal elongated beams is attached to the corresponding lateral coupler with a flexure.

The third transduction/suspension structure may comprise one or more third flexures 233 with lateral flexibility, and each first transversal elongated beam 223 may be attached to the first lateral coupler 243 with at least one of said one or more third flexures 233. Correspondingly, the fourth transduction/suspension structure may comprise one or more fourth flexures 234 with lateral flexibility, and each second transversal elongated beam 224 may be attached to the second lateral coupler 244 with at least one of said one or more fourth flexures 234.

The third and fourth coupling springs 253-254 are more flexible in the transversal direction than in the lateral direction. FIG. 3a illustrates that they undergo little movement in the lateral oscillation mode. The first and second coupling springs 251-252, on the other hand, are laterally compressed and expanded when the proof mass 21 moves back and forth in this oscillation mode. The first and second coupling springs flexibly accommodate the lateral oscillation mode so that very little energy from this oscillation mode is transmitted to the first and second transversal couplers 241-242 and first and second lateral elongated beams 221-222 in the first and second transduction/suspension structures.

FIG. 3b illustrates a transversal oscillation mode where the proof mass moves back and forth in the transversal direction. In this oscillation mode, transversal drive forces generated by drive transducers in the first and second transduction/suspension structures set the proof mass into transversal back and forth oscillation. The first and second transversal couplers 241-242 rigidly transmit the transversal bending of the first and second lateral elongated beams 221-222 into transversal movement in the proof mass 21. Conversely, the influence of the Coriolis force on the transversal oscillation of the proof mass 21 is transmitted by the transversal couplers 241-242 to the first and second lateral elongated beams 221-222, and this influence can be sensed by sense transducers on these beams.

The lateral and transversal couplers are substantially rigid at least in the direction in which they extend. They may have any suitable shape. The elongated shapes illustrated in this disclosure are beneficial because they allow the surface area of the gyroscope to remain small. The narrower dimension of the lateral and transversal couplers may have a width of at least 20-40 μm so that they do not undergo bending or other deformation. The lateral and transversal couplers can fulfil the same technical function even if they have significantly lower length/width aspect ratios than the ones illustrated in the FIG. 2a.

The first and second coupling springs 251-252 are more flexible in the lateral direction than in the transversal direction. FIG. 3b illustrates that they undergo little movement in the transversal oscillation mode. The third and fourth coupling springs 253-254, on the other hand, are transversally compressed and expanded when the proof mass 21 moves back and forth in this oscillation mode. The third and fourth coupling springs flexibly accommodate the transversal oscillation mode so that very little energy from this oscillation mode is transmitted to the first and second lateral couplers 243-244 and the first and second transversal elongated beams 223-224 in the third and fourth transduction/suspension structures.

The transduction/suspension structures described in this disclosure thereby allow the lateral and transversal oscillation modes of the proof mass to be controlled independently. This facilitates synchronized driving of these two oscillation modes, which can be used to set the proof mass for example in circular oscillation motion or oscillation in a Lissajous pattern. These two types of drive oscillation are particularly advantageous because the influence of the Coriolis force on the frequency of the circular/Lissajous movement can be reliably measured with the sense transducers in the transduction/suspension structures.

Figure 4:
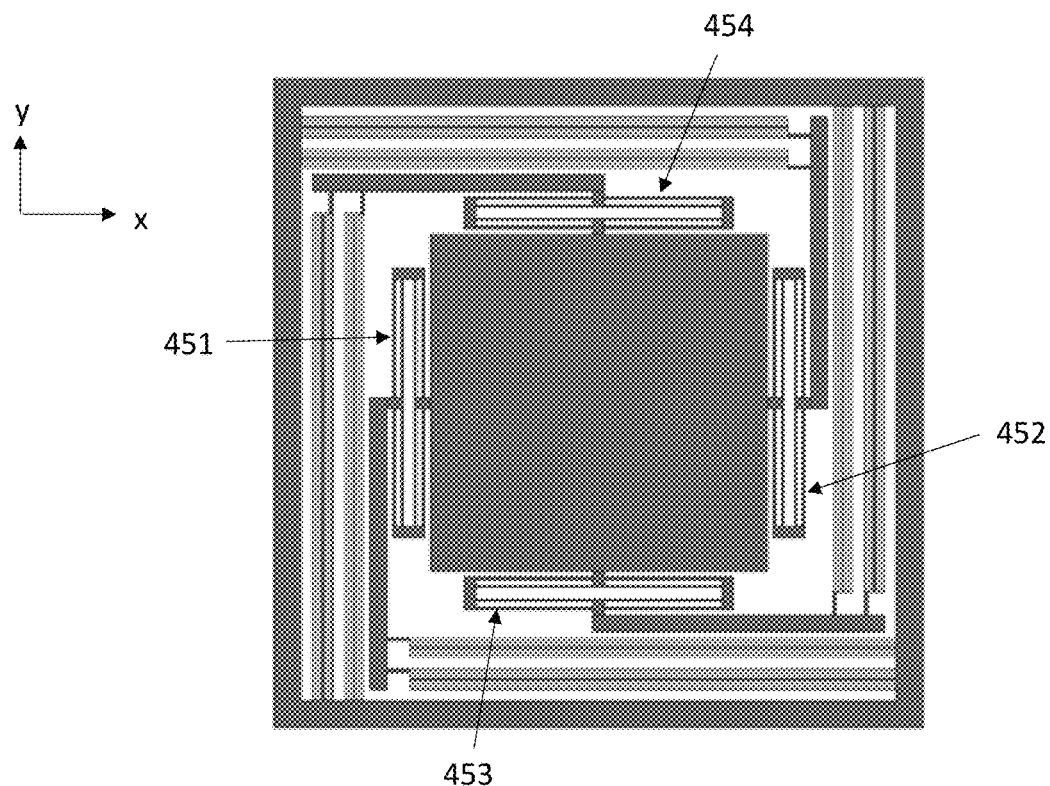
FIGS. 4-5 illustrate alternative structures for the coupling springs.
Figure 5:
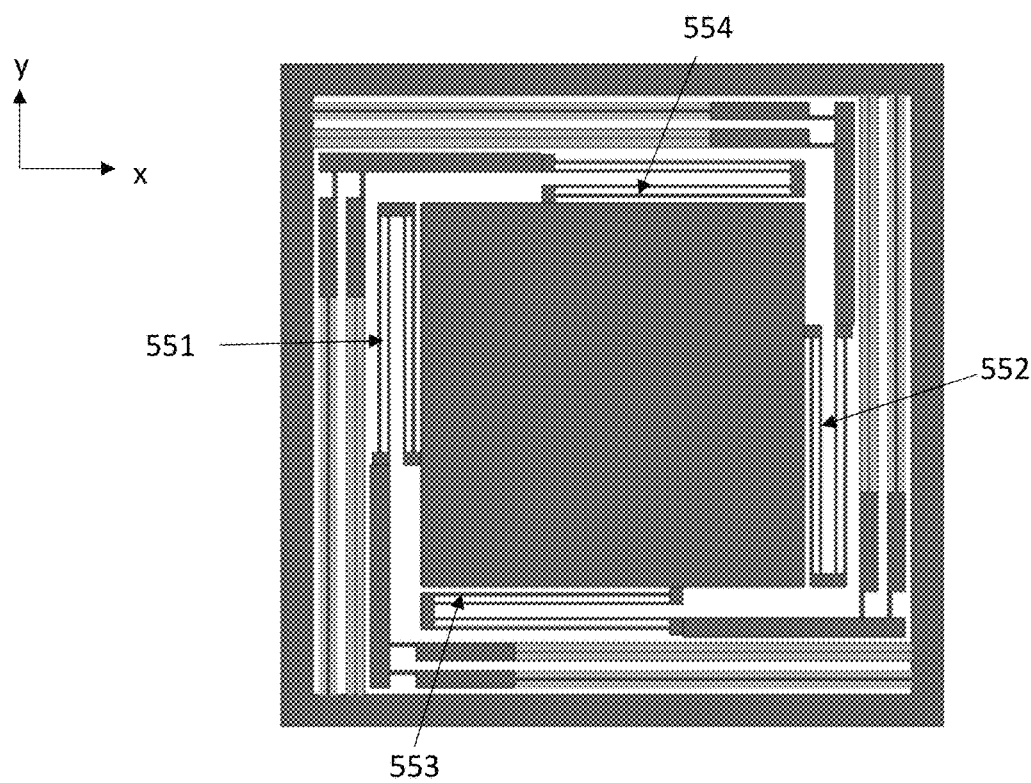

FIGS. 4-5 illustrate alternative structures for the first, second, third and fourth coupling springs in FIGS. 2a-2b. The previous figures illustrated coupling springs 251-254 with a leaf-spring structure. FIG. 4 illustrates coupling springs 451-454 with a double-leaf-spring structure. Meander shapes can also be used. FIG. 5 illustrates coupling springs with an asymmetric meander structure with one turn. The meandering could alternatively comprise multiple turns. The beams which form the leaf-springs, double-leaf-springs or meandering springs may for example have a width of 2-10 μm.

It would also be possible to increase the number of lateral and transversal elongated beams further, so that each transduction/suspension structure includes three or more elongated beams attached to the same coupler. All elongated beams in the first, second, third and fourth transduction/suspension structures do not necessarily have to be coated with piezoelectric transducers. They can also be used simply to guide the movement of the attached coupler, as described above, or to adjust the resonance frequency of the oscillating system. Increasing the beam width to increase the resonance frequency would increase thermoelastic damping. Adding more beams increases the resonance frequency without increasing thermoelastic damping and it may be a more preferable way to increase the resonance frequency than increasing the beam width.

Center Embodiment

Figure 6A:
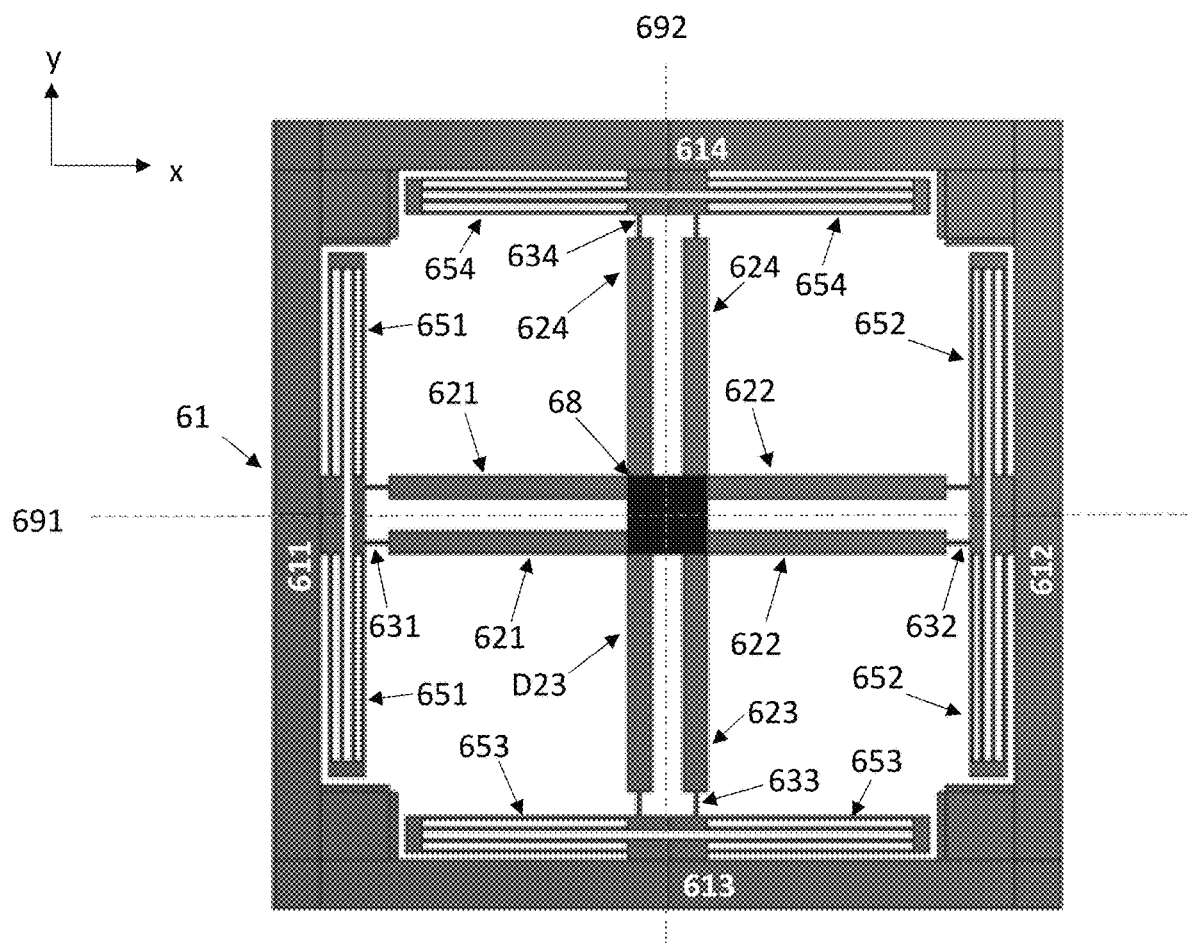
FIG. 6a illustrates an embodiment where the transduction/suspension structures and coupling springs are placed in an opening within the proof mass.

FIG. 6a illustrates an embodiment where the transduction/suspension structures and coupling springs are placed in an opening within the proof mass. The proof mass is shaped like a frame which surrounds the anchor points. Reference numbers 61, 611-614, 651-654 and 691-692 correspond to reference numbers 11, 111-114, 151-154 and 191-192, respectively, in FIG. 1b. The opening is quite large in FIG. 6a. It would be possible to increase the weight of the proof mass by extending it also into the white regions in FIG. 6a, where most of the reference numbers are now located. The beams and coupling springs still need enough space to undergo the intended oscillating motion.

In this embodiment the first, second, third and fourth transduction/suspension structures are located within a central opening in the proof mass 61. The proof mass has a first side and a laterally opposing second side, so that the first side and the second side are separated from each other by a lateral width. The proof mass has a third side and a transversally opposing fourth side, so that the third side and the fourth side are separated from each other by a transversal width.

The one or more first lateral elongated beams 621 extend from the corresponding one or more anchor points 68 in the first lateral direction toward the first side 611 of the proof mass 61. The first coupling spring 651 extends from the one or more first lateral elongated beams 621 to the proof mass 61.

The one or more second lateral elongated beams 622 extend from the corresponding one or more anchor points 68 in the second lateral direction toward the second side 612 of the proof mass 61. The second coupling spring 652 extends from the one or more second lateral elongated beams 622 to the proof mass 61.

The one or more first transversal elongated beams 623 extend from the corresponding one or more anchor points 68 in the first transversal direction toward the third side 613 of the proof mass 61. The third coupling spring 653 extends from the one or more first transversal elongated beams 623 to the proof mass 61.

The one or more second transversal elongated beams 624 extend from the corresponding one or more anchor points 68 in the second lateral direction toward the fourth side 614 of the proof mass 61. The fourth coupling spring 654 extends from the one or more second transversal elongated beams 624 to the proof mass 61.

The operating principle of the gyroscope illustrated in FIG. 6a is the same as that of the gyroscopes illustrated in FIGS. 2a-2c. That is, piezoelectric transducers placed on the first and second transversal elongated beams 623-624 can bend these beams and thereby generate a lateral force which drives the proof mass 61 in a first oscillation mode illustrated in FIG. 6b. The first and second coupling springs 651 and 652 flexibly accommodate this oscillation mode. The first oscillation mode may also be measured with piezoelectric transducers placed on the first and second transversal elongated beams 623-624. The third and fourth coupling springs 653 and 654 are in this case substantially rigid in the lateral direction, which allows them to transmit lateral forces efficiently between the first and second transversal elongated beams 623-624 and the proof mass 61.

Figure 6B:
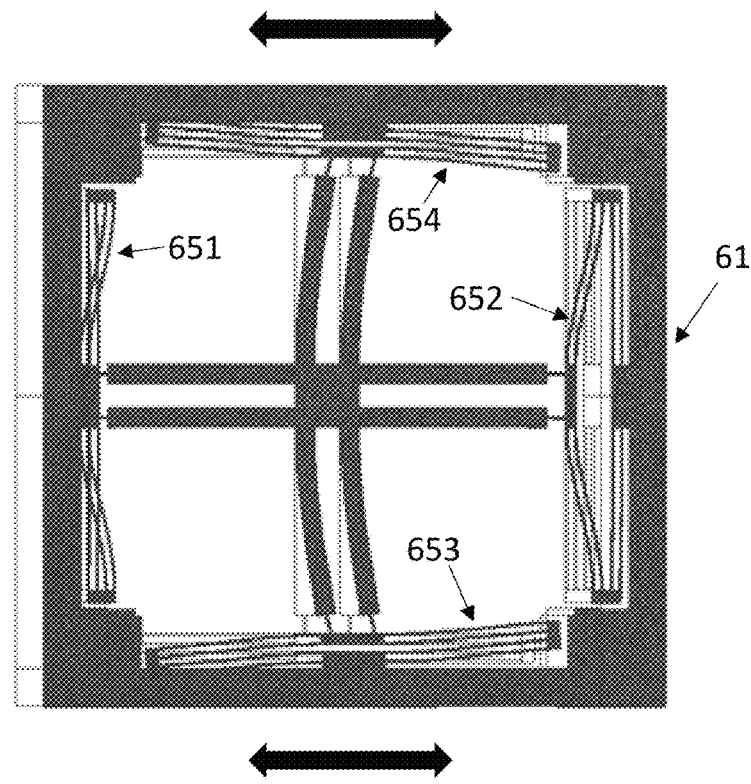
Figure 6C:
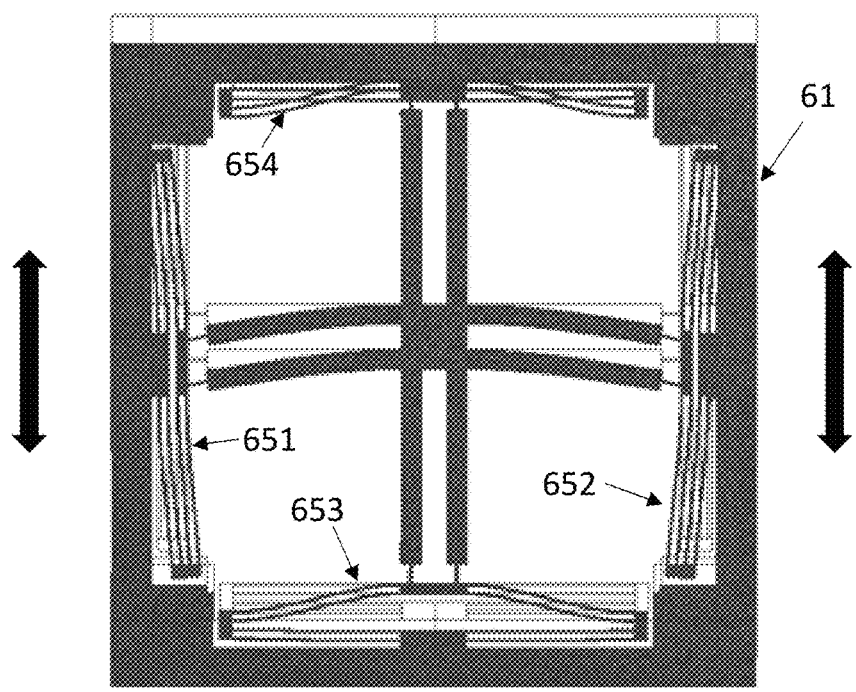

Conversely, piezoelectric transducers placed on the first and second lateral elongated beams 621-622 can bend these beams and thereby generate a transversal force which drives the proof mass 61 in a second oscillation mode illustrated in FIG. 6c. The third and fourth coupling springs 653 and 654 flexibly accommodate this oscillation mode. The second oscillation mode may also be measured with piezoelectric transducers placed on the first and second lateral elongated beams 621-622. The first and second coupling springs 651 and 652 are in this case substantially rigid in the transversal direction, which allows them to transmit transversal forces efficiently between the first and second lateral elongated beams 621-622 and the proof mass 61.

Each of the one or more first lateral elongated beams may be attached to the first coupling spring with a flexure. Each of the one or more second lateral elongated beams may be attached to the second coupling spring with a flexure. Each of the one or more first transversal elongated beams may be attached to the third coupling spring with a flexure. Each of the one or more second transversal elongated beams may be attached to the fourth coupling spring with a flexure.

As in the previous embodiment, the oscillation which the proof mass undergoes in the first oscillation mode is substantially independent of its oscillation in the second oscillation mode. When the driving of the first oscillation mode is synchronized in a suitable manner with the driving of the second oscillation mode, the proof mass can be stably driven for example in a circular or Lissajous trajectory in the device plane.

Due to the simple geometry of this device, the lateral and transversal elongated beams can be connected to the four sides of the proof mass without any intervening coupling structures, although additional couplers could be used if necessary.

As indicated above, in this embodiment the one or more anchor points may comprise just a single anchor point 68 as in FIG. 6a, However, multiple anchor points could alternatively be placed in the center of the device, for example so so that each lateral and transversal elongated beam is attached to its own anchor point. In that case, the one or more could comprise one or more first anchor points, one or more second anchor points, one or more third anchor points and one or more four anchor points, where each set of anchor points corresponds to a set of lateral or transversal elongated beams.

It can be seen in FIG. 6a that the one or more lateral elongated beams 621 consists of two beams in FIG. 6a. The number of second lateral elongated beams 622, first transversal elongated beams 623 and second transversal elongated beams 624 is likewise two. As in the previous embodiment, this number could in each case instead be one, three, or any other suitable number.

General Options Which Apply to Both Embodiments

Each elongated beam may be attached directly to the corresponding coupler or coupling spring even without any intervening flexure. However, if one end of an elongated beam is clamped to the anchor point and the other to a lateral or transversal coupler, the beam may bend into a form which resembles the letter S in that the curvature of the beam changes direction somewhere near the middle of the beam. This may not be optimal because it limits the displacement that a drive transducer on the beam can generate and the signal strength by which a sense transducer on the beam measures the displacement of the proof mass.

The benefit of using a flexure to attach each elongated beam to the corresponding coupler or coupling spring is that the forces which restrict the bending of the beam in the fully clamped configuration will only deform the flexure, but not the elongated beam. This allows the elongated beam to bend in the same direction along its entire length, allowing a greater displacement to be generated by drive transducers on the beam and a stronger signal to be generated by sense transducers. The optimal length of the flexure depends on the dimensions of the elongated beam. The flexure should be sufficiently long to allow the elongated beam to bend along its entire length, but also sufficiently short to facilitate efficient force transfer from the elongated beam to the corresponding coupler.

The dimensions of the proof mass may be selected so that a desired resonant frequency is achieved. The proof mass may for example have the shape of a square and the width of the proof mass may for example be in the range 100-2000 µm, 200-800 µm or 300-600 µm. The length of any elongated beam may be longer than any side of the proof mass. These dimensions apply also to square-frame proof mass presented in another embodiment of this disclosure.

Figure 7:
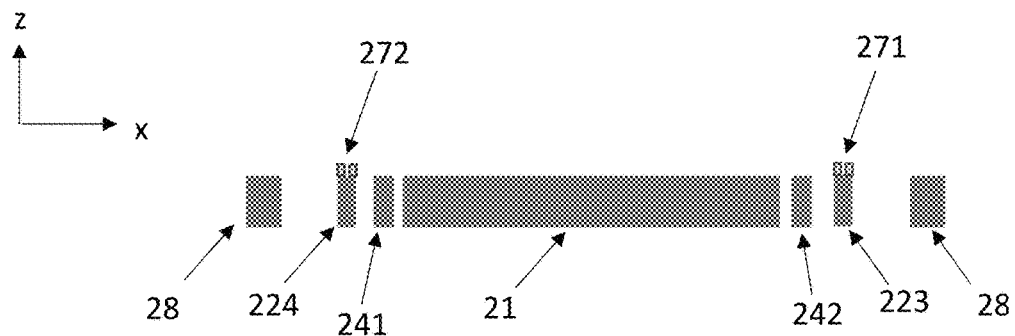

FIG. 7 illustrates a cross section of the gyroscope from FIG. 2a in the xz-plane along the lateral axis 291. Piezoelectric force transducers 271 and 272 lie on top of the first (223) and second (224) transversal elongated beams, respectively. Transducers may be placed on the lateral and transversal beams of the gyroscope in FIG. 6a in the same manner.

The transversal elongated beams have a transversal length and a lateral width. The lateral elongated beams have a lateral length and a transversal width. In both of these cases, the length/width aspect ratio of the elongated beams may for example be in the range 4-30, 6-20 or 8-12. All transversal elongated beams in the gyroscope may, but do not necessarily need to, have the same dimensions. All lateral elongated beams in the gyroscope may, but do not necessarily need to, have the same dimensions. All transversal elongated beams may, but do not necessarily need to, have the same dimensions as all lateral elongated beams. The transversal and lateral elongated beams should have dimensions which allow piezoelectric drive transducers to bend them and allow the oscillation proof mass—transducer structure system to obtain suitable resonance frequencies. The optimal dimensions for the elongated beams therefore depend on the dimensions and weight of the proof mass and the other parts of the transduction/suspension structures, and on how the piezoelectric transducers are implemented.

The piezoelectric force transducers on the lateral elongated beams may have the same dimensions as the transducers on the transversal elongated beams. This is an easy way to facilitate equal oscillation frequencies in the lateral and the transversal directions. Alternatively, if the dimensions of the transducers on the lateral elongated beams differ from those of the transducers on the transversal elongated beams, a compensating frequency offset between the lateral and the transversal oscillation may be designed for example by adjusting the dimensions of the elongated beams or couplers in one or more corresponding transduction/suspension structure.

Figure 8:
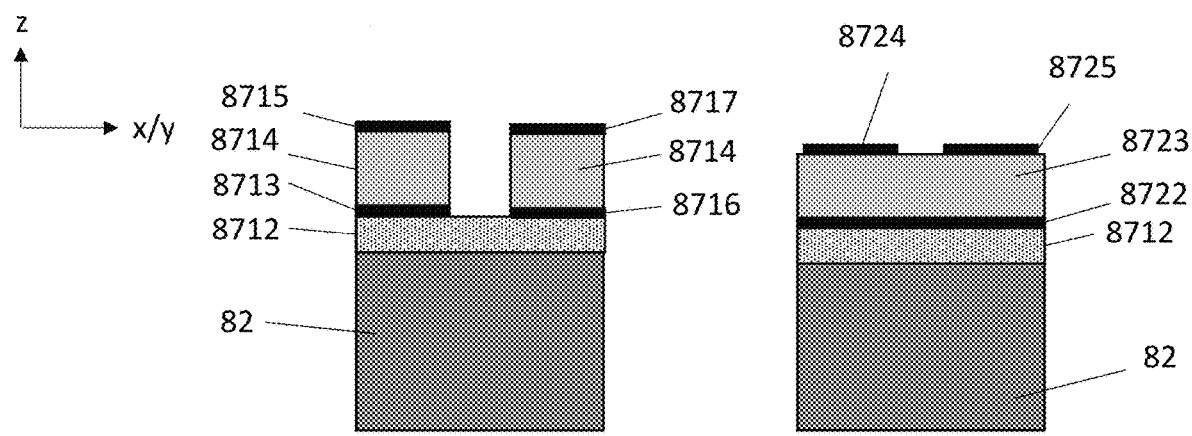
FIG. 8 illustrates two alternative piezoelectric transducers.

FIG. 8 illustrates xz- or yz-cross sections of two alternative piezoelectric transducer structures on an elongated beam 82 (either a lateral or a transversal one). Either of the two structures illustrated in FIG. 8 may be used to form the drive transducers and sense transducers described in this disclosure. Both transducers (left and right in FIG. 8) comprise several thin-film layers deposited on top of the elongated beam 82. All layers illustrated in this figure extend along the length of the beam in the direction which is perpendicular to the illustrated plane. A transducer may extend along the entire length of an elongated beam, but it may alternatively extend only along part of the beam.

A layer of insulating material 8712 may isolate the thin-film layers from the elongated beam 82. The insulating material may for example be silicon dioxide or silicon nitride and it may have a thickness in the range 400 nm-2 um.

The transducer on the left in FIG. 8 comprises two separate bottom electrodes 8713 and 8716, a separate layer of piezoelectric material 8714 on each bottom electrode 8713, and a corresponding top electrode 8715 and 8717 on each layer of piezoelectric material 8714. The electrodes can be metal electrodes, for example molybdenum, platinum, aluminum, or any other conductive material such as polycrystalline silicon. The thickness of the electrodes may be in the range 50 nm-300 nm. The piezoelectric material may be aluminum nitride or lead zirconate titanium oxide (PZT) and its thickness may be in the range 500 nm-4 um or 1 um-2 um.

A voltage applied between the bottom and top electrodes generates a force in the direction of the x/y-axis shown in FIG. 8. As discussed above, if the elongated beams are connected to the lateral/transversal couplers with flexures, this force can be generated along the entire length of the beam. The elongated beam can then bend as a cantilever with a substantially linear force-displacement relationship.

The right side of FIG. 8 shows an alternative implementation. An insulating layer 8712 again overlies the beam 82. One bottom electrode 8722 covers the insulating layer and one layer of piezoelectric material 8723 covers the bottom electrode 8722. Two electrically separated top electrodes 8724 and 8725 have been deposited on top of a single layer of piezoelectric material 8723. To induce displacement in the direction of the x/y-axis, the bottom electrode 8722 is grounded or allowed to assume a floating potential and a voltage difference is applied between top electrodes 8724 and 8725. In this configuration, if the beam 82 is a silicon beam it is also possible to omit both the insulating layer 8712 and the bottom electrode 8722 and use the beam 82 as the ground electrode.

Any piezoelectric force transducer mentioned in this disclosure can be configured to have either one of the structures illustrated in FIG. 8, or any other suitable piezoelectric transducer structure.

In a first beam configuration, illustrated for example in FIG. 2a, the one or more first lateral elongated beams consist of one first lateral elongated beam, the one or more second lateral elongated beams consist of one second lateral elongated beam, the one or more first transversal elongated beams consist of one first transversal elongated beam, and the one or more second transversal elongated beams consist of one second transversal elongated beam.

In this first beam configuration, the one or more lateral piezoelectric transducers may comprise at least one first piezoelectric drive transducer which is configured to bend the corresponding first or second lateral elongated beam in the device plane and at least one first piezoelectric sense transducer which is configured to measure the bending of the corresponding first or second lateral elongated beam in the device plane. None of the at least one first piezoelectric drive transducers is one of the at least one first piezoelectric sense transducers. The one or more transversal piezoelectric transducers may comprise at least one second piezoelectric drive transducer which is configured to bend the corresponding first or second transversal elongated beam in the device plane and at least one second piezoelectric sense transducer which is configured to measure the bending of the corresponding first or second transversal elongated beam in the device plane. None of the at least one second piezoelectric drive transducers is one of the at least one second piezoelectric sense transducers.

In this first beam configuration, a first alternative transducer arrangement is that the at least one first piezoelectric drive transducer consists of one piezoelectric transducer on the first lateral elongated beam, the at least one second piezoelectric drive transducer consists of one piezoelectric transducer on the first transversal elongated beam, and the at least one first piezoelectric sense transducer consists of one piezoelectric transducer on the second lateral elongated beam, and the at least one second piezoelectric sense transducer consists of one piezoelectric transducer on the second transversal elongated beam.

A second alternative transducer arrangement in this first beam configuration is that the at least one first piezoelectric drive transducer consists of one piezoelectric transducer on the first lateral elongated beam and one piezoelectric transducer on the second lateral elongated beam, the at least one second piezoelectric drive transducer consists of one piezoelectric transducer on the first transversal elongated beam and one piezoelectric transducer on the second transversal elongated beam, and the at least one first piezoelectric sense transducer consists of one piezoelectric transducer on the first lateral elongated beam and one piezoelectric transducer on the second lateral elongated beam, and the at least one second piezoelectric sense transducer consists of one piezoelectric transducer on the first transversal elongated beam and one piezoelectric transducer on the second transversal elongated beam.

In a second beam configuration, illustrated in FIGS. 2b and 6a with two beams on each side, the one or more first lateral elongated beams consist of two or more first lateral elongated beams, the one or more second lateral elongated beams consist of two or more second lateral elongated beams, the one or more first transversal elongated beams consist of two or more first transversal elongated beams and the one or more second transversal elongated beams consist of two or more second transversal elongated beams.

In this second beam configuration, the one or more lateral piezoelectric transducers may comprise at least one first piezoelectric drive transducer which is configured to bend the corresponding first or second lateral elongated beam in the device plane and at least one first piezoelectric sense transducer which is configured to measure the bending of the corresponding first or second lateral elongated beam in the device plane. None of the at least one first piezoelectric drive transducers is one of the at least one first piezoelectric sense transducers.

The one or more transversal piezoelectric transducers may comprise at least one second piezoelectric drive transducer which is configured to bend the corresponding first or second transversal elongated beam in the device plane and at least one second piezoelectric sense transducer which is configured to measure the bending of the corresponding first or second transversal elongated beam in the device plane. None of the at least one second piezoelectric drive transducers is one of the at least one second piezoelectric sense transducers.

In this second beam configuration, a first alternative transducer arrangement is that the at least one first piezoelectric drive transducer consists of one piezoelectric transducer on one of the two or more first lateral elongated beams and one piezoelectric transducer on one of the two or more second lateral elongated beams, and the at least one second piezoelectric drive transducer consists of one piezoelectric transducer on one of the two or more first transversal elongated beams and one piezoelectric transducer on one of the two or more second transversal elongated beams. In this arrangement, the at least one first piezoelectric sense transducer consists of one piezoelectric transducer another of the two or more first lateral elongated beams and one piezoelectric transducer on another of the two or more second lateral elongated beams, and the at least one second piezoelectric sense transducer consists of one piezoelectric transducer another of the two or more first transversal elongated beams and one piezoelectric transducer on another of the two or more second transversal elongated beams.

A second alternative transducer arrangement in this second beam configuration is that the at least one first piezoelectric drive transducers consist of one piezoelectric transducer on each of the two or more first lateral elongated beams and one piezoelectric transducer on each of the two or more second lateral elongated beams, and the at least one second piezoelectric drive transducer consists of one piezoelectric transducer on each of the two or more first transversal elongated beams and one piezoelectric transducer on each of the two or more second transversal elongated beams, and the at least one first piezoelectric sense transducer consists of one piezoelectric transducer on each of the two or more first lateral elongated beams and one piezoelectric transducer on each of the two or more second lateral elongated beams, and the at least one second piezoelectric sense transducer consists of one piezoelectric transducer on each of the two or more first transversal elongated beams and one piezoelectric transducer on each of the two or more second transversal elongated beams.

The various transducer options described above in the second beam configuration can also be implemented in the device illustrated in FIG. 2c.

Four-Mass Gyroscope with Anti-Phase Coupling

Figure 9:
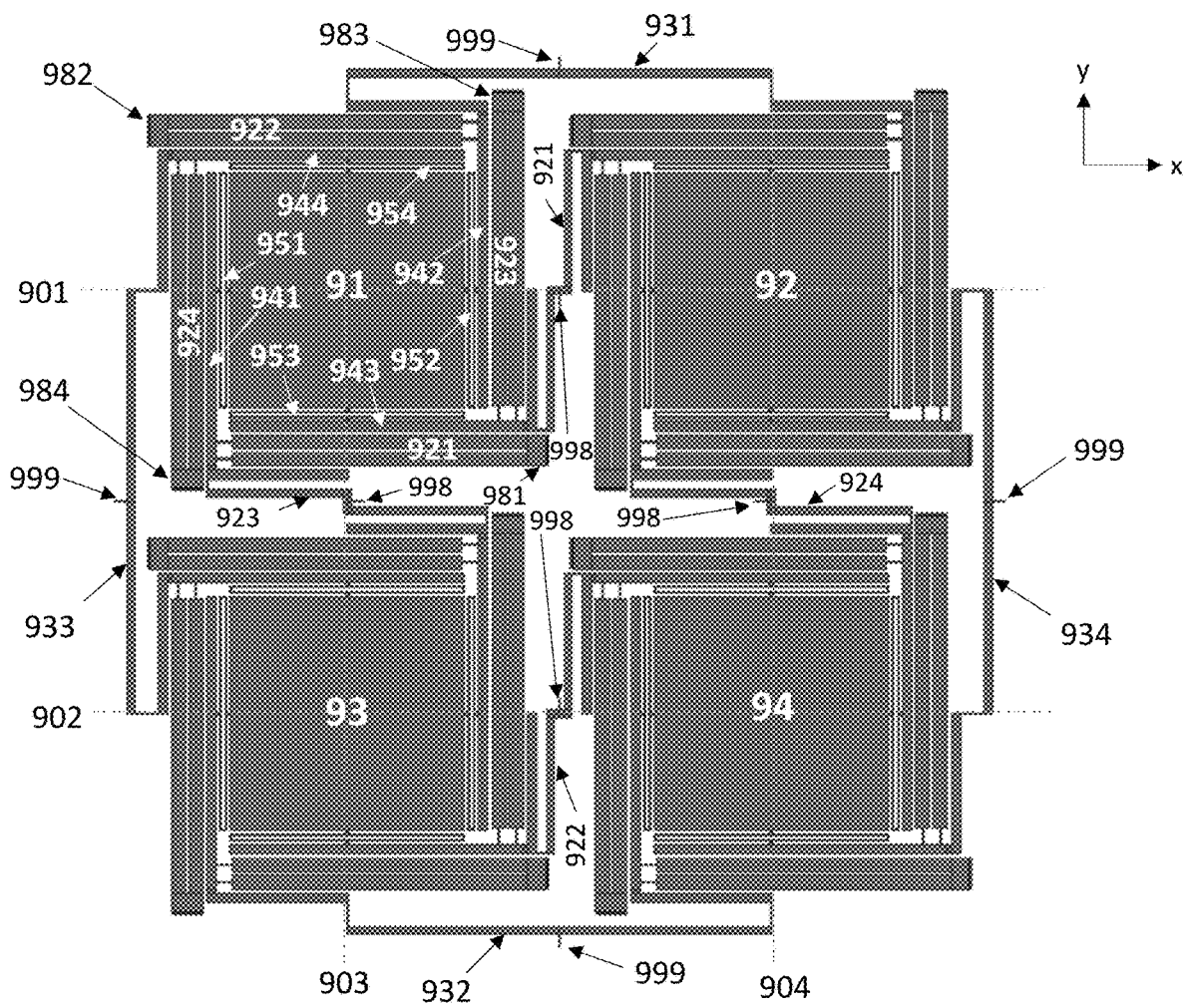
FIG. 9 illustrates a first four-mass gyroscope with synchronization.

Both the periphery embodiment and the center embodiment can be expanded to form a gyroscope with four interconnected proof masses. FIG. 9 illustrates a four-mass gyroscope where reference numbers 91, 921-924, 941-944, 951-954, 981-984, 901 and 903 correspond to reference numbers 21, 221-224, 241-244, 251-254, 281-284, 291 and 292 respectively, in FIGS. 2a-2b. The movement of proof mass 91 can be driven and sensed in the manner which has been discussed above when the periphery embodiment was presented.

The first proof mass 91 is connected to a second proof mass 92 with a central synchronization structure and a peripheral synchronization structure. The second proof mass is aligned on the same lateral axis 901 as the first proof mass, but on a different transversal axis 904.

The peripheral synchronization structure may comprise a peripheral elongated bar 931 which is suspended from a peripheral anchor point 999 with a suspension arrangement which allows the peripheral elongated bar 931 to rotate in the device plane. Similarly, the central synchronization structure 998 may comprise a central elongated bar 921 which is suspended from a central anchor point 998 with a suspension arrangement which allows the central elongated bar 921 to rotate in the device plane.

The first proof mass 91 is also connected to a third proof mass 93 with a corresponding central elongated bar (923) and peripheral elongated bar (933). The third proof mass 93 is aligned on the same transversal axis 903 as the first proof mass 91, but on a different lateral axis 902.

The third proof mass 93 is also connected to a fourth proof mass 94 with a corresponding central elongated bar (922) and peripheral elongated bar (932). The fourth proof mass 94 is aligned on the same lateral axis 902 as the first proof mass 91 and on the same transversal axis 904 as the second proof mass 92. The fourth proof mass 94 is also connected to the second proof mass 92 with a corresponding central elongated bar (924) and peripheral elongated bar (934).

Each peripheral elongated bar (931, 932, 933, 934) and each central elongated bar (921, 922, 923, 924) may be coupled to the corresponding proof masses via the lateral/transversal couplers 941-944 which surround each proof mass. The presence of the coupling springs 951-954 in each coupling chain continues to ensure that the lateral first oscillation mode shown in FIG. 3a remains independent of the transversal second oscillation mode shown in FIG. 3b for each of the proof masses 91-94.

When the drive oscillation of the four proof masses 91-94 is suitably timed, the seesaw movement of each central and peripheral elongated bar will synchronize the movement of the four proof masses in the first and second oscillation modes very effectively, while still maintaining the independence of these two modes. This synchronization will be described in more detail below after the four-mass version of the center embodiment has been presented.

Figure 10:
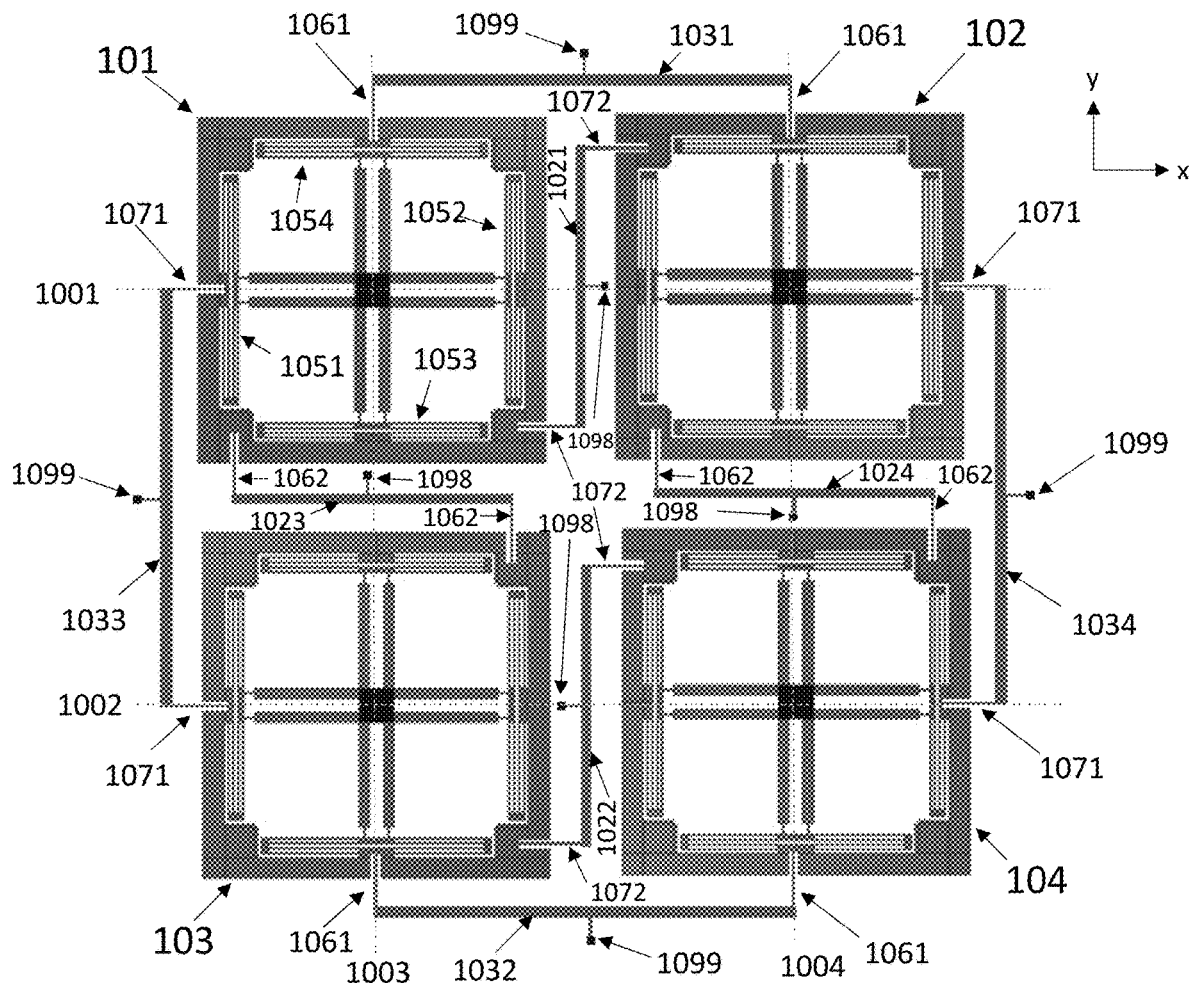
FIG. 10 illustrates a second four-mass gyroscope with synchronization.

FIG. 10 illustrates a four-mass gyroscope where reference numbers 101-104, 1001-1004, 1021, 1022, 1023, 1024, 1031, 1032, 1033, 1034, and 1098-1099 correspond to reference numbers 91-94, 901-904, 921, 922, 923, 924, 931, 932, 933, 934, and 998-999 respectively, in FIG. 9. Reference numbers 1051-1054 correspond to reference numbers 651-654 in FIG. 6a. Furthermore, the shape of the proof masses 101-104, their suspension arrangement and the transduction/suspension structures all correspond to the center embodiment which was presented above. The other reference numbers showing device parts known from FIG. 6a have not been repeated in FIG. 10.

The central and peripheral elongated bars 1021, 1022, 1023, 1024, 1031, 1032, 1033, 1034 are in FIG. 10 connected between the proof masses 101-104 according to the same principles that were discussed with reference to FIG. 9. However, there are also a few differences which should be noted. Unlike in FIG. 9, the elongated bars in FIG. 10 cannot be coupled to the transduction/suspension structures which are joined to the proof masses with coupling springs 1051-1054 because those structures are in the center embodiment located inside each proof mass.

Both the central and peripheral elongated bars 1021, 1022, 1023, 1024, 1031, 1032, 1033, 1034 have for this reason been connected to the corresponding proof masses with connectors which provide the flexibility needed for preserving the independence of the first and second oscillation modes illustrated in FIGS. 6b and 6c.

Peripheral elongated bars 1031 and 1032, which transmit forces in the transversal direction, have been coupled to the proof masses with transversal connectors 1061 which are rigid in the transversal direction but flexible in the lateral direction. Peripheral elongated bars 1033 and 1034, which transmit forces in the lateral direction, have been coupled to the proof masses with lateral connectors 1071 which are rigid in the lateral direction but flexible in the transversal direction.

Correspondingly, central elongated bars 1023 and 1024, which transmit forces in the transversal direction, have been coupled to the proof masses with transversal connectors 1062 which are rigid in the transversal direction but flexible in the lateral direction. Central elongated bars 1021 and 1022, which transmit forces in the lateral direction, have been coupled to the proof masses with lateral connectors 1072 which are rigid in the lateral direction but flexible in the transversal direction.

Figure 11A:
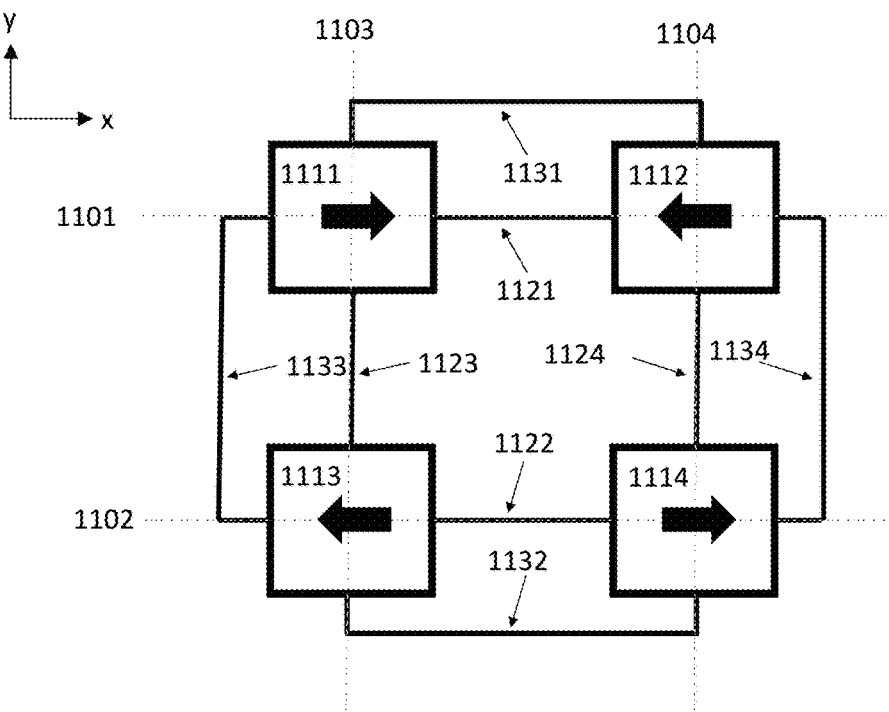
FIGS. 11a-11d illustrate desired an undesired lateral oscillation in a four-mass gyroscope.

FIG. 11a illustrates schematically with solid black arrows how the first oscillation modes of the four masses may be synchronized in both the peripheral embodiment and in the center embodiment. Reference numbers 1101-1104, 1111-1114, 1121-1124 and 1131-1134 correspond to reference numbers 901-904, 91-94, 921-924 and 931-934, respectively, in FIG. 9 and reference numbers 1001-1004, 101-104, 1021-1024 and 1031-1034, respectively, in FIG. 10.

The central and peripheral coupling structures 1121-1122 and 1133-1134 promote the first oscillation mode where masses 1111 and 1112 move towards each other on the first lateral axis 1101 as masses 1113 and 1114 simultaneously move away from each other on the second lateral axis 1102. In the opposite half of the oscillation cycle, masses 1111 and 1112 move away from each other while masses 1113 and 1114 move towards each other.

Figure 11B:
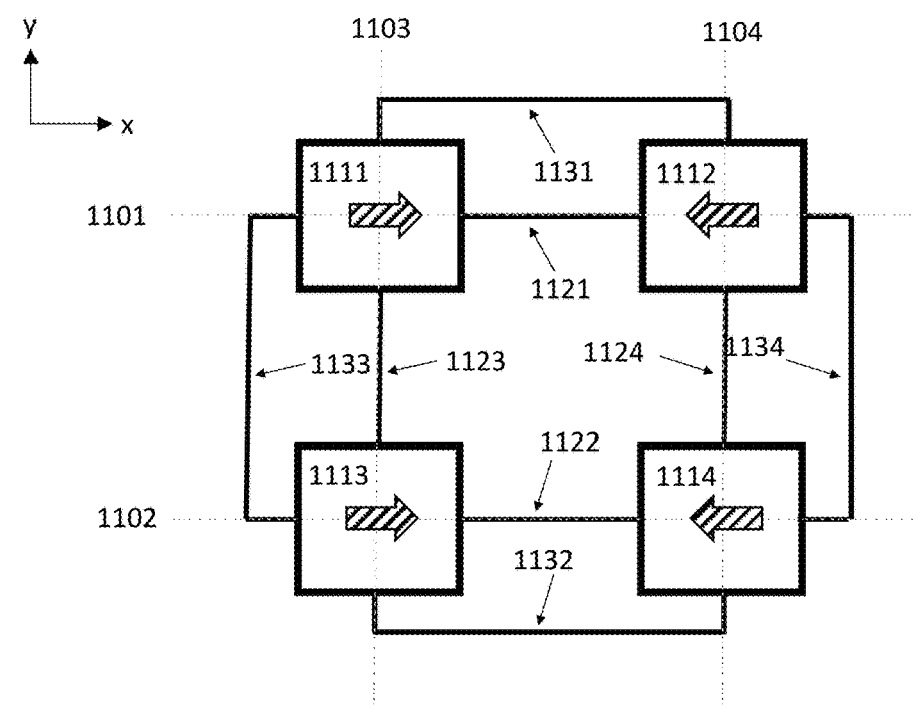
Figure 11C:
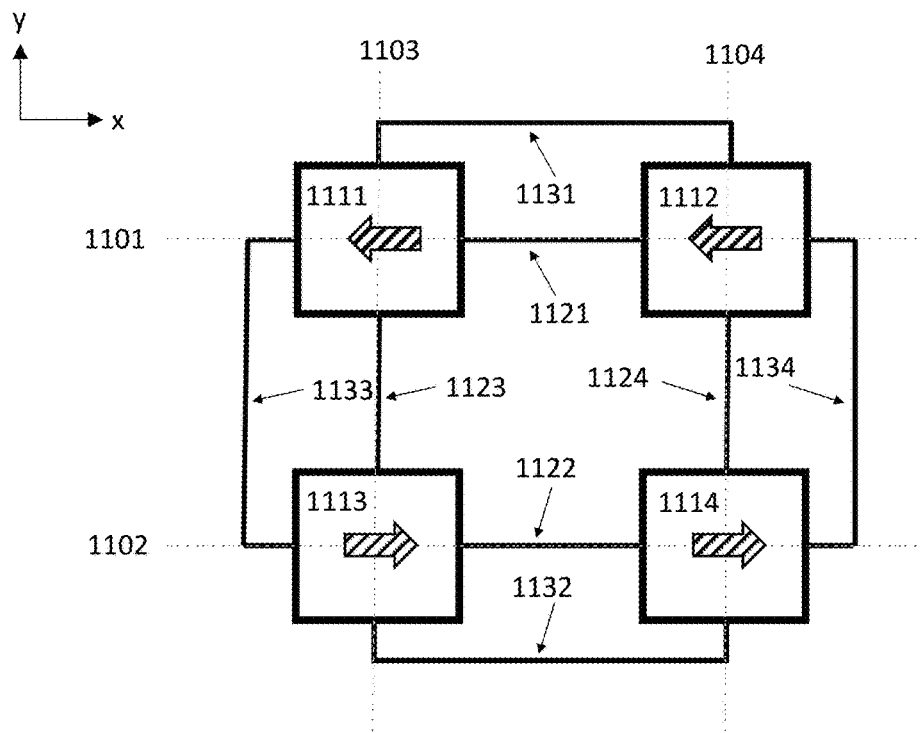
Figure 11D:
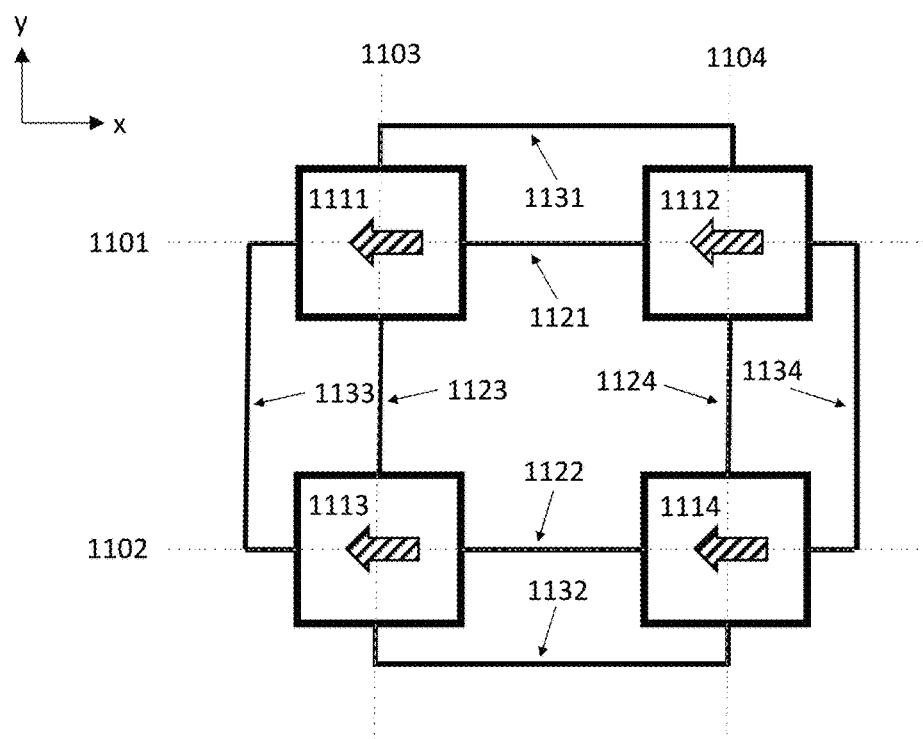

FIGS. 11b, 11c and 11d illustrate with patterned arrows three undesired oscillation modes where cophasal oscillation occurs. The peripheral coupling structures 1133-1134 resist the cophasal oscillation shown in FIG. 11b where both proof mass pairs 1111+1112 and 1113+1114 oscillate towards each other at the same time. The central coupling structures 1121-1122 resist the cophasal oscillation shown in FIG. 11c, which can be induced by angular acceleration. Proof masses 1111 and 1112 move simultaneously in one lateral direction while 1113 and 1114 move simultaneously in the other lateral direction. And finally, both the central 1121-1122 and peripheral 1133-1134 coupling structures resist the cophasal oscillation induced by linear acceleration in FIG. 11d, where all four proof masses 1111-1114 move in the same direction.

Figure 12A:
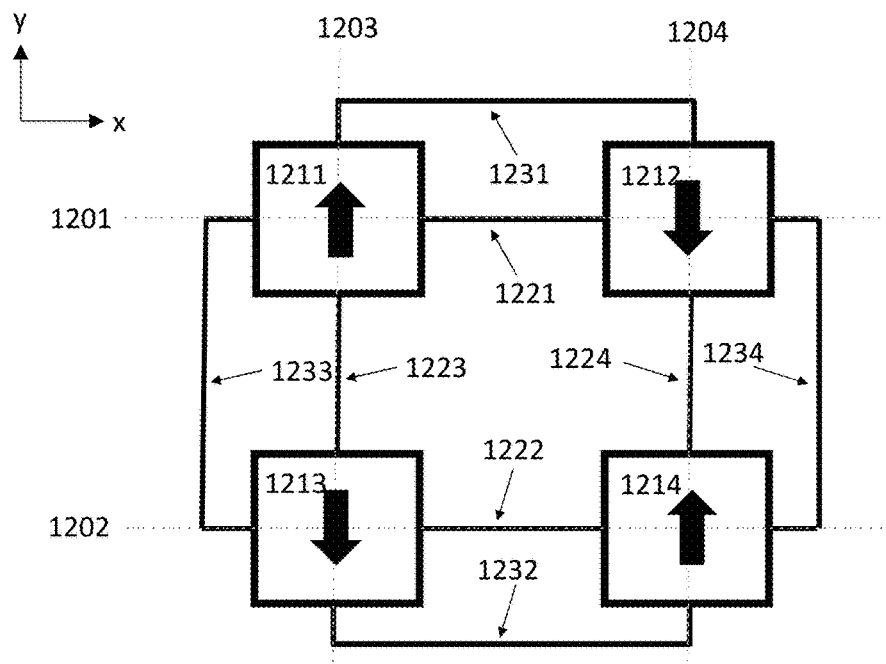
FIGS. 12a-12d illustrate desired an undesired transversal oscillation in a four-mass gyroscope.

FIG. 12a illustrates schematically the synchronization of the second oscillation mode. Reference numbers 1201-1204, 1211-1214, 1221-1224 and 1231-1234 correspond to reference numbers 901-904, 91-94, 921-924 and 931-934, respectively, in FIG. 9 and reference numbers 1001-1004, 101-104, 1021-1024 and 1031-1034, respectively, in FIG. 10.

The central and peripheral coupling structures 1223-1224 and 1231-1232 promote the second oscillation mode where masses 1211 and 1213 move away from each other on the first transversal axis 1203 as masses 1212 and 1214 simultaneously move towards each other on the second transversal axis 1204. In the opposite half of the oscillation cycle, masses 1211 and 1213 move towards each other while masses 1212 and 1214 move away from each other.

Figure 12B:
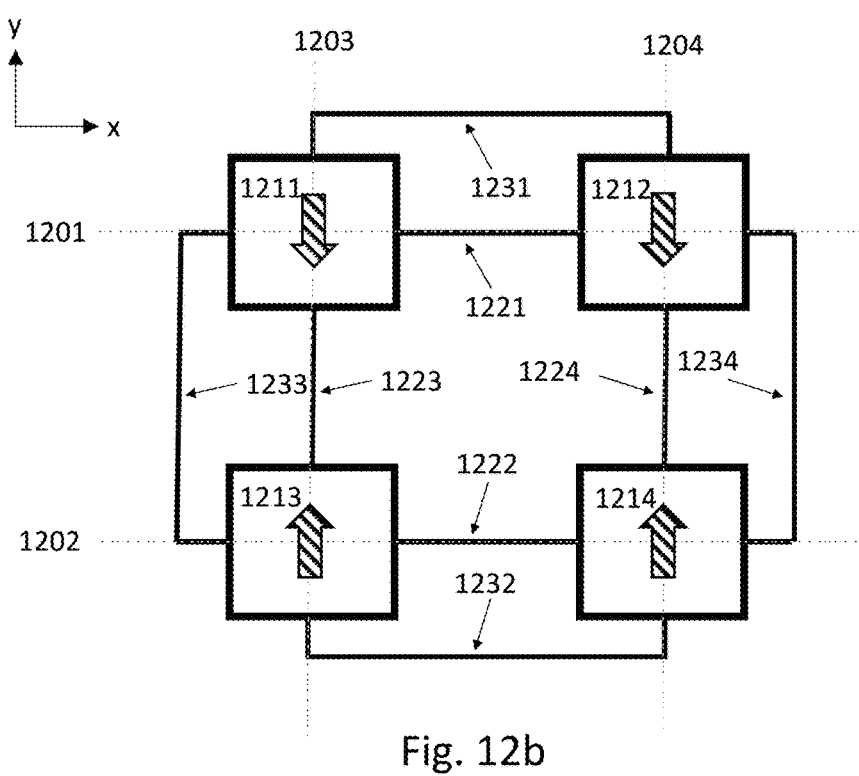
Figure 12C:
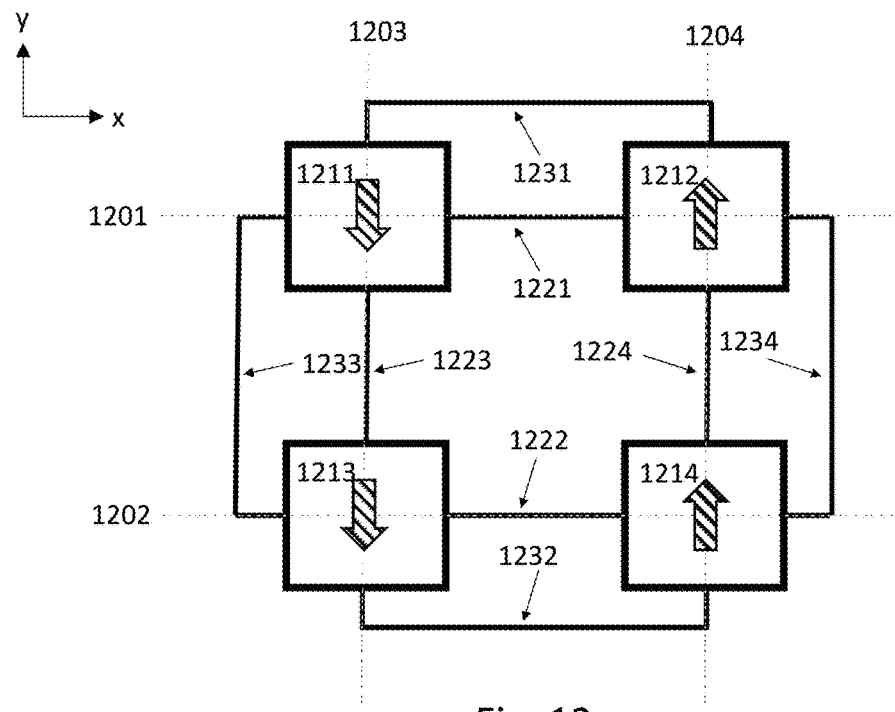
Figure 12D:
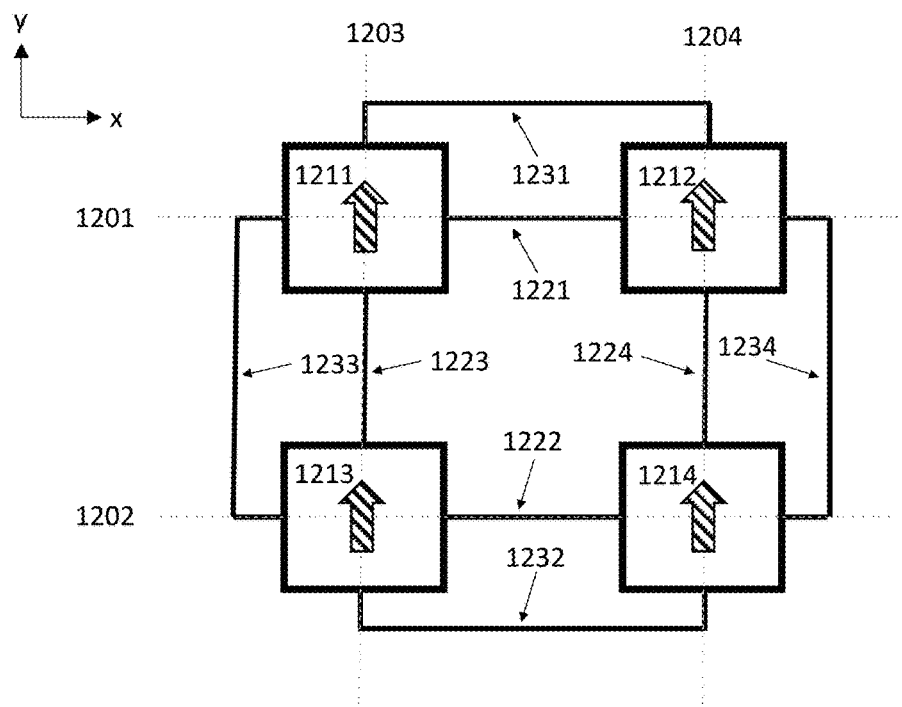

FIGS. 12b, 12c and 12d illustrate three undesired oscillation modes with cophasal oscillation. The peripheral coupling structures 1231-1232 resist the cophasal oscillation shown in FIG. 12b where both proof mass pairs 1211+1213 and 1212+1214 oscillate towards each other at the same time. The central coupling structures 1223-1224 resist the cophasal oscillation shown in FIG. 12c, which can be induced by angular acceleration. Proof masses 1211 and 1213 move simultaneously in one transversal direction while 1212 and 1214 move simultaneously in the other transversal direction. And finally, both the central 1223-1224 and peripheral 1231-1232 coupling structures resist the cophasal oscillation induced by linear acceleration in FIG. 12d, where all four proof masses 1211-1214 move in the same direction.

When the central (1121, 1122, 1221, 1222) and peripheral (1133, 1134, 1233, 1234) coupling structures are coupled to the corresponding proof masses (1111-1114, 1211-1214) with coupling elements which are flexible in the transversal direction and stiff in the lateral direction, each of these coupling element will transmit force only in the lateral direction and dissipate forces which act in the transversal direction. Correspondingly, when the other central (1123, 1124, 1223, 1224) and peripheral (1131, 1132, 1231, 1232) coupling structures are coupled to the corresponding proof masses (1111-1114, 1211-1214) with coupling elements which are flexible in the lateral direction and stiff in the transversal direction, each coupling element will transmit force only in the transversal direction and dissipate forces which act in the lateral direction.

The technical purpose of all central and peripheral coupling structures described is to increase the resonance frequency of undesired oscillation modes, such as the ones shown in FIGS. 11b-11c and 12b-12c.

Figure 13:
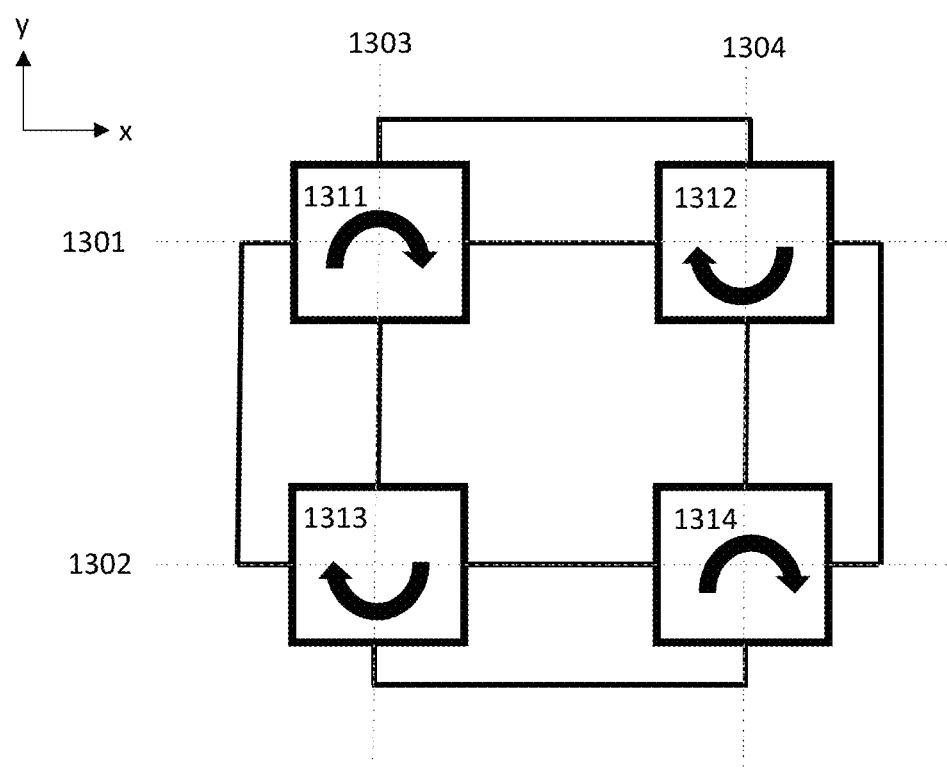
FIG. 13 illustrates how four proof masses can be driven in circular trajectories.

The benefit of the coupling and synchronization arrangements is that the first and second oscillation modes can be synchronized effectively while still remaining independent of each other. The four proof masses can then be driven for example on the circular trajectories illustrated in FIG. 13, where reference numbers 1311-1314 correspond to reference numbers 1111-1114 and 1211-1214, respectively, in FIGS. 11a and 12a. The four proof masses 1311-1314 are synchronized to rotate either clockwise or counter-clockwise and can be used to sense rotation rate as with a single proof mass structure. The four masses increase the sense signal amplitude and reduce noise level, enabling better resolution than can be achieved with a single mass device. Importantly, the coupled four mass structure is mechanically insensitive to linear and angular acceleration that would result in in-phase mass movement. The coupled four mass structure can therefore have better ability to measure small rotation rates in the presence of linear or angular acceleration.

The peripheral elongated bars 931-934 and 1031-1034 synchronize the movement of the proof masses by undergoing seesaw movement where they rotate in the device plane about the corresponding anchor point 999 and 1099.

The central elongated bars 921-924 and 1021-1024 synchronize the movement of the proof masses by undergoing seesaw movement where they rotate in the device plane about the corresponding anchor point 998 and 1098.

The invention claimed is:

1. A gyroscope comprising a proof mass in a device plane defined by a lateral axis and a transversal axis which is orthogonal to the lateral axis, wherein the gyroscope further comprises a first structure which is coupled to the proof mass with a laterally flexible first coupling spring from a first coupling direction, a second structure which is coupled to the proof mass with a laterally flexible second coupling spring from a second coupling direction, a third structure which is coupled to the proof mass with a transversally flexible third coupling spring from a third coupling direction, and a fourth structure which is coupled to the proof mass with a transversally flexible fourth coupling spring from a fourth coupling direction, wherein the first and second coupling directions are substantially opposite to each other, the third and fourth coupling directions are substantially opposite to each other, and the first and second coupling directions are substantially perpendicular to the third and fourth coupling directions, and the first structure comprises one or more first lateral elongated beams which extend from corresponding one or more anchor points in a first lateral direction, the second structure comprises one or more second lateral elongated beams which extend from corresponding one or more anchor points in a second lateral direction, wherein the second lateral direction is opposite to the first, and the third structure comprises one or more first transversal elongated beams which extend from corresponding one or more anchor points in a first transversal direction, and the fourth structure comprises one or more second transversal elongated beams which extend from corresponding one or more anchor points in a second transversal direction, wherein the second transversal direction is opposite to the first, and the first and second structures further comprise one or more lateral piezoelectric transducers which have been deposited on the one or more first or second lateral elongated beams, and the third and fourth structures further comprise one or more transversal piezoelectric transducers which have been deposited on the one or more first or second transversal elongated beams, wherein said one or more lateral piezoelectric transducers are configured to bend the corresponding lateral elongated beams in the device plane and to measure the bending of the corresponding lateral elongated beams in the device plane and said one or more transversal piezoelectric transducers are configured to bend the corresponding transversal elongated beams in the device plane and to measure the bending of the corresponding transversal elongated beams in the device plane.

2. The gyroscope according to claim 1, wherein the one or more first lateral elongated beams consist of one first lateral elongated beam, the one or more second lateral elongated beams consist of one second lateral elongated beam, the one or more first transversal elongated beams consist of one first transversal elongated beam, and the one or more second transversal elongated beams consist of one second transversal elongated beam.

3. The gyroscope according to claim 2, wherein the one or more lateral piezoelectric transducers comprise at least one first piezoelectric drive transducer which is configured to bend the corresponding first or second lateral elongated beam in the device plane and at least one first piezoelectric sense transducer which is configured to measure the bending of the corresponding first or second lateral elongated beam in the device plane, wherein none of the at least one first piezoelectric drive transducers is one of the at least one first piezoelectric sense transducers, and the one or more transversal piezoelectric transducers comprise at least one second piezoelectric drive transducer which is configured to bend the corresponding first or second transversal elongated beam in the device plane and at least one second piezoelectric sense transducer which is configured to measure the bending of the corresponding first or second transversal elongated beam in the device plane, wherein none of the at least one second piezoelectric drive transducers is one of the at least one second piezoelectric sense transducers.

4. The gyroscope according to claim 3, wherein the at least one first piezoelectric drive transducer consists of one piezoelectric transducer on the first lateral elongated beam, the at least one second piezoelectric drive transducer consists of one piezoelectric transducer on the first transversal elongated beam, and the at least one first piezoelectric sense transducer consists of one piezoelectric transducer on the second lateral elongated beam, and the at least one second piezoelectric sense transducer consists of one piezoelectric transducer on the second transversal elongated beam.

5. The gyroscope according to claim 3, wherein the at least one first piezoelectric drive transducer consists of one piezoelectric transducer on the first lateral elongated beam and one piezoelectric transducer on the second lateral elongated beam, the at least one second piezoelectric drive transducer consists of one piezoelectric transducer on the first transversal elongated beam and one piezoelectric transducer on the second transversal elongated beam, and the at least one first piezoelectric sense transducer consists of one piezoelectric transducer on the first lateral elongated beam and one piezoelectric transducer on the second lateral elongated beam, and the at least one second piezoelectric sense transducer consists of one piezoelectric transducer on the first transversal elongated beam and one piezoelectric transducer on the second transversal elongated beam.

6. The gyroscope according to claim 1, wherein the one or more first lateral elongated beams consist of two or more first lateral elongated beams, the one or more second lateral elongated beams consist of two or more second lateral elongated beams, the one or more first transversal elongated beams consist of two or more first transversal elongated beams, and the one or more second transversal elongated beams consist of two or more second transversal elongated beams.

7. The gyroscope according to claim 6, wherein the one or more lateral piezoelectric transducers comprise at least one first piezoelectric drive transducer which is configured to bend the corresponding first or second lateral elongated beam in the device plane and at least one first piezoelectric sense transducer which is configured to measure the bending of the corresponding first or second lateral elongated beam in the device plane, wherein none of the at least one first piezoelectric drive transducers is one of the at least one first piezoelectric sense transducers, and the one or more transversal piezoelectric transducers comprise at least one second piezoelectric drive transducer which is configured to bend the corresponding first or second transversal elongated beam in the device plane and at least one second piezoelectric sense transducer which is configured to measure the bending of the corresponding first or second transversal elongated beam in the device plane, wherein none of the at least one second piezoelectric drive transducers is one of the at least one second piezoelectric sense transducers.

8. The gyroscope according to claim 7, wherein the at least one first piezoelectric drive transducer consists of one piezoelectric transducer on one of the two or more first lateral elongated beams and one piezoelectric transducer on one of the two or more second lateral elongated beams, and the at least one second piezoelectric drive transducer consists of one piezoelectric transducer on one of the two or more first transversal elongated beams and one piezoelectric transducer on one of the two or more second transversal elongated beams, and the at least one first piezoelectric sense transducer consists of one piezoelectric transducer on another of the two or more first lateral elongated beams and one piezoelectric transducer on another of the two or more second lateral elongated beams, and the at least one second piezoelectric sense transducer consists of one piezoelectric transducer on another of the two or more first transversal elongated beams and one piezoelectric transducer on another of the two or more second transversal elongated beams.

9. The gyroscope according to claim 7, wherein the at least one first piezoelectric drive transducers consist of one piezoelectric transducer on each of the two or more first lateral elongated beams and one piezoelectric transducer on each of the two or more second lateral elongated beams, and the at least one second piezoelectric drive transducer consists of one piezoelectric transducer on each of the two or more first transversal elongated beams and one piezoelectric transducer on each of the two or more second transversal elongated beams, and the at least one first piezoelectric sense transducer consists of one piezoelectric transducer on each of the two or more first lateral elongated beams and one piezoelectric transducer on each of the two or more second lateral elongated beams, and the at least one second piezoelectric sense transducer consists of one piezoelectric transducer on each of the two or more first transversal elongated beams and one piezoelectric transducer on each of the two or more second transversal elongated beams.

10. The gyroscope according to claim 1, wherein the first, second, third and fourth structures are placed around the periphery of the proof mass, and the proof mass has a first side and a laterally opposing second side, so that the first side and the second side are separated from each other by a lateral width, and the proof mass has a third side and a transversally opposing fourth side, so that the third side and the fourth side are separated from each other by a transversal width, and the one or more first lateral elongated beams extend from the corresponding one or more anchor points in the first lateral direction along the third side of the proof mass, and the first structure also comprises a first transversal coupler, wherein each of the one or more first lateral elongated beams is attached to the first transversal coupler, and the first transversal coupler extends along the first side of the proof mass, and the first coupling spring extends from the first transversal coupler to the proof mass, and the one or more second lateral elongated beams extend from the corresponding one or more anchor points in the second lateral direction along the fourth side of the proof mass, and the second structure also comprises a second transversal coupler, wherein each of the one or more second lateral elongated beams is attached to the second transversal coupler, and the second transversal coupler extends along the second side of the proof mass, and the second coupling spring extends from the second transversal coupler to the proof mass, and the one or more first transversal elongated beams extend from the corresponding one or more anchor points in the first transversal direction along the second side of the proof mass, and the third structure also comprises a first lateral coupler, wherein each of the one or more first transversal elongated beams is attached to the first lateral coupler, and the first lateral coupler extends along the third side of the proof mass, and the third coupling spring extends from the first lateral coupler to the proof mass, and the one or more second transversal elongated beams extend from the corresponding one or more anchor points in the second transversal direction along the first side of the proof mass, and the fourth structure also comprises a second lateral coupler, wherein each of the one or more second transversal elongated beams is attached to the second lateral coupler and the second lateral coupler extends along the fourth side of the proof mass, and the fourth coupling spring extends from the second lateral coupler to the proof mass, and the one or more second transversal elongated beams are further away from the first side of the proof mass than the first transversal coupler, the one or more first transversal elongated beams are further away from the second side of the proof mass than the second transversal coupler, the one or more first lateral elongated beams are further away from the third side of the proof mass than the first lateral coupler, and the one or more second lateral elongated beams are further away from the fourth side of the proof mass than the second lateral coupler.

11. The gyroscope according to claim 10, wherein each of the lateral elongated beams is attached to the corresponding transversal coupler with a flexure, and each of the transversal elongated beams is attached to the corresponding lateral coupler with a flexure.

12. The gyroscope according to claim 1, wherein the first, second, third and fourth structures are located within a central opening in the proof mass, and the proof mass has a first side and a laterally opposing second side, so that the first side and the second side are separated from each other by a lateral width, and the proof mass has a third side and a transversally opposing fourth side, so that the third side and the fourth side are separated from each other by a transversal width, and the one or more first lateral elongated beams extend from the corresponding one or more first anchor points in the first lateral direction toward the first side of the proof mass, and the first coupling spring extends from the one or more first lateral elongated beams to the proof mass, and the one or more second lateral elongated beams extend from the corresponding one or more second anchor points in the second lateral direction toward the second side of the proof mass, and the second coupling spring extends from the one or more second lateral elongated beams to the proof mass, and the one or more first transversal elongated beams extend from the corresponding one or more third anchor points in the first transversal direction toward the third side of the proof mass, and the third coupling spring extends from the one or more first transversal elongated beams to the proof mass, and the one or more second transversal elongated beams extend from the corresponding one or more fourth anchor points in the second lateral direction toward the fourth side of the proof mass, and the fourth coupling spring extends from the one or more second transversal elongated beams to the proof mass.

13. The gyroscope according to claim 12, wherein each of the one or more first lateral elongated beams is attached to the first coupling spring with a flexure, each of the one or more second lateral elongated beams is attached to the second coupling spring with a flexure, each of the one or more first transversal elongated beams is attached to the third coupling spring with a flexure, each of the one or more second transversal elongated beams is attached to the fourth coupling spring with a flexure.

* * * * *